US012212069B2

(12) United States Patent
Kadichevitz et al.

(10) Patent No.: US 12,212,069 B2
(45) Date of Patent: Jan. 28, 2025

(54) ANTENNA FOR A WIRELESS COMMUNICATION DEVICE AND SUCH A DEVICE

(71) Applicant: HUAWEI TECHNOLOGIES CO., LTD., Shenzhen (CN)

(72) Inventors: Michael Kadichevitz, Hod Hasharon (IL); Doron Ezri, Hod Hasharon (IL); Avi Weitzman, Hod Hasharon (IL); Xiao Zhou, Shanghai (CN); Xin Luo, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 135 days.

(21) Appl. No.: 17/983,189

(22) Filed: Nov. 8, 2022

(65) Prior Publication Data

US 2023/0136183 A1 May 4, 2023

Related U.S. Application Data

(63) Continuation of application No. PCT/CN2020/089436, filed on May 9, 2020.

(51) Int. Cl.
*H01Q 21/20* (2006.01)
*H01Q 1/22* (2006.01)
(Continued)

(52) U.S. Cl.
CPC ......... *H01Q 21/205* (2013.01); *H01Q 1/2291* (2013.01); *H01Q 1/48* (2013.01); *H01Q 13/085* (2013.01); *H01Q 21/0075* (2013.01)

(58) Field of Classification Search
None
See application file for complete search history.

(56) References Cited

U.S. PATENT DOCUMENTS 2,283,897 A 5/1942 Alford
4,672,386 A * 6/1987 Wood .................. H01Q 21/205 343/846

(Continued)

FOREIGN PATENT DOCUMENTS

CN 102403571 A 4/2012
CN 105552530 A 5/2016

(Continued)

*Primary Examiner* — Anh Q Tran
(74) *Attorney, Agent, or Firm* — Leydig, Voit & Mayer, Ltd.

(57) ABSTRACT

An antenna for a wireless communication device, such as a Wi-Fi access point is provided. The antenna includes an electrically conductive radiation structure including a plurality of radially extending radiation slots, each of which has an open outer end at a perimeter of the electrically conductive radiation structure and defines a respective radiation portion of the electrically conductive radiation structure. The antenna includes a feeding network configured to feed an RF signal to the electrically conductive radiation structure, the feeding network includes a plurality of feeding arms configured to feed the RF signal into each radiation portion of the electrically conductive radiation structure for exciting each radiation portion to emit electromagnetic waves. The antenna includes a grounding structure including an electrically conductive grounding surface, which is spaced from and faces each radiation portion of the electrically conductive radiation structure for guiding the electromagnetic waves emitted by each radiation portion.

20 Claims, 23 Drawing Sheets

(51) Int. Cl.

| | |
|---|---|
| ***H01Q 1/48*** | (2006.01) |
| ***H01Q 13/08*** | (2006.01) |
| ***H01Q 21/00*** | (2006.01) |

(56) References Cited

U.S. PATENT DOCUMENTS

| | | | | |
|---|---|---|---|---|
| 5,767,809 | A | 6/1998 | Chuang et al. | |
| 6,366,254 | B1 | 4/2002 | Sievenpiper et al. | |
| 8,031,129 | B2 | 10/2011 | Shtrom et al. | |
| 9,270,029 | B2 | 2/2016 | Shtrom | |
| 9,509,062 | B2 | 11/2016 | Jervis et al. | |
| 9,748,655 | B2 * | 8/2017 | Lee | H01Q 9/0435 |
| 2004/0135649 | A1 * | 7/2004 | Sievenpiper | H01Q 3/24 333/105 |
| 2005/0116874 | A1 | 6/2005 | El-Mahdawy et al. | |
| 2014/0313093 | A1 | 10/2014 | Smith et al. | |
| 2015/0229026 | A1 * | 8/2015 | Lindmark | H01Q 21/24 343/770 |

FOREIGN PATENT DOCUMENTS

| | | | |
|---|---|---|---|
| CN | 106450792 | A | 2/2017 |
| CN | 106848530 | A | 6/2017 |

* cited by examiner

ANTENNA FOR A WIRELESS COMMUNICATION DEVICE AND SUCH A DEVICE

CROSS-REFERENCE TO RELATED APPLICATIONS

This application is a continuation of International Application No. PCT/CN2020/089436, filed on May 9, 2020, the disclosure of which is hereby incorporated by reference in its entirety.

TECHNICAL FIELD

The present disclosure relates to wireless communications in general. More specifically, the present disclosure relates to an antenna for a wireless communication device as well as such a wireless communication device.

BACKGROUND

The wireless fidelity (Wi-Fi) protocol was developed to provide services to numerous users at arbitrary locations within the coverage area of a Wi-Fi access point (AP; also referred to as base station). In order to enable an access point to cover a large region of its environment, its antenna should have an omnidirectional radiation pattern. Moreover, for improving the multiple-input multiple-output (MIMO) performance of an access point, it is known to provide an access point with vertically and horizontally polarized antennas (also known as V-Pol and H-Pol antennas).

Access points used, for instance, in offices (also known as enterprise APs) are often installed on the ceiling of a respective office room. In order to decrease the number of APs in an office deployment, each AP needs to cover a large area. Consequently, such an AP needs to have a low radiating angle so that clients underneath the AP are provided with a sufficient signal strength. This requirement faces considerable challenges for low profile APs, i.e., APs having a small build height. In such an AP due to the limited vertical dimensions of the housing of the AP the radiation elements must be placed at a very small distance from the AP's ground plan, which causes the radiation beam to tilt perpendicularly to the ground plan. Consequently, these radiation elements provide a high radiation angle (above the ground) and small coverage area. The requirements of a compact form-factor, a low profile and a low radiation angle are partially conflicting and therefore difficult to achieve with a horizontal dipole array. Moreover, the antenna(s) of an AP should have a high gain (>4 dBi). However, reducing the height of an antenna also reduces its gain, because the area covered by the antenna increases.

Thus, there is a need for an improved antenna with a low radiating angle and a small build height as well as a for a wireless communication device comprising such an antenna.

SUMMARY

The present disclosure provides an improved antenna for a wireless communication device with a low radiating angle and a small build height as well as a wireless communication device comprising such an antenna.

The implementations of the present disclosure are achieved by the subject matter of the independent claims. Further implementations are apparent from the dependent claims, the description and the figures.

According to a first aspect an antenna for a wireless device is provided. The antenna comprises an electrically conductive radiation structure for generating electromagnetic waves, a feeding network for feeding a radio frequency (RF) signal to the electrically conductive radiation structure for generating the electromagnetic waves and a grounding structure for guiding the electromagnetic waves generated by the electrically conductive radiation structure. The electrically conductive radiation structure defines a plurality of radially extending radiation slots. Each of the plurality of radially extending radiating slots has an open outer end at a perimeter of the electrically conductive radiation structure and defines a radiation portion of the electrically conductive radiation structure. The feeding network comprises a plurality of feeding arms configured to feed the RF signal into each of the plurality of radiation portions of the electrically conductive radiation structure for exciting each of the radiation portions and the radially extending radiation slots to emit electromagnetic waves. The grounding structure defines an electrically conductive grounding surface, wherein the electrically conductive grounding surface is spaced from and faces the plurality of radiation portions of the electrically conductive radiation structure for guiding the electromagnetic waves emitted by the plurality of radiation portions. Thus, advantageously, an improved antenna with a low radiating angle and a small build height is provided.

In a further possible implementation of the first aspect, the plurality of radiation portions of the electrically conductive radiation structure are at least partially coplanar, i.e., extend at least partially in the same plane.

In a further possible implementation of the first aspect, the electrically conductive grounding surface extends at least partially in parallel to the plurality of radiation portions of the electrically conductive radiation structure.

In a further possible implementation of the first aspect, the electrically conductive radiation structure is radially symmetric.

In a further possible implementation of the first aspect, the electrically conductive radiation structure defines at least three radially extending radiation slots, wherein the at least three radially extending radiation slots define at least three radiation portions of the electrically conductive radiation structure.

In a further possible implementation of the first aspect, the plurality of radially extending radiation slots and the plurality of radiation portions are uniformly distributed around a centre of the electrically conductive radiation structure.

In a further possible implementation of the first aspect, each of the plurality of feeding arms is arranged and configured such that at least a feeding arm portion of each feeding arm is inductively or galvanically coupled to a respective radiation portion of the electrically conductive radiation structure for exciting the respective radiation portion to emit electromagnetic waves.

In a further possible implementation of the first aspect, each feeding arm portion extends substantially perpendicular to a respective radially extending radiation slot.

In a further possible implementation of the first aspect, the antenna further comprises an electrically non-conductive substrate, wherein the electrically conductive radiation structure and the feeding network are arranged on different sides of the non-conductive substrate and wherein electrically non-conductive material of the electrically non-conductive substrate at least partially fills the plurality of radially extending radiation slots.

In a further possible implementation of the first aspect, each radially extending radiation slot extends from its open outer end at the perimeter of the electrically conductive radiation structure to an inner end having a finite radius. In other words, for each radially extending radiation slot there is a finite distance between the inner end of the respective slot and the centre of the electrically conductive radiation structure, which is filled by the material of the electrically conductive radiation structure.

In a further possible implementation of the first aspect, the electrically conductive radiation structure further defines a plurality of radially extending de-coupling slots for de-coupling the plurality of radiation portions of the electrically conductive radiation structure, wherein each of the radially extending de-coupling slots has an open outer end at the perimeter of the electrically conductive radiation structure.

In a further possible implementation of the first aspect, the electrically conductive radiation structure further defines a respective recess at a respective inner radius of a radially extending de-coupling slot, wherein each recess has a width larger than a width of the respective radially extending de-coupling slot.

In a further possible implementation of the first aspect, each radially extending de-coupling slot is arranged half-way between two adjacent radially extending radiation slots.

In a further possible implementation of the first aspect, for each radially extending de-coupling slot the antenna further comprises one or more metal strips, wherein the one or more metal strips are arranged to extend radially adjacent to a respective radially extending de-coupling slot.

In a further possible implementation of the first aspect, for each feeding arm the antenna further comprises a switch in series, wherein all of the plurality of radiation portions of the electrically conductive radiation structure are excited by the RF signal provided by the feeding network for providing omni-directional electromagnetic waves, when all of the plurality of switches are closed, and wherein only a subset of the plurality of radiation portions of the electrically conductive radiation structure are excited by the RF signal provided by the feeding network, when a subset of the plurality of switches are open for providing directional electromagnetic waves. Advantageously, this allows to selectively provide different radiation patterns with the antenna.

In a further possible implementation of the first aspect, for each feeding arm the antenna further comprises a switch in parallel electrically connected to the electrically conductive grounding surface, wherein all of the plurality of radiation portions of the electrically conductive radiation structure are excited by the RF signal provided by the feeding network for providing omni-directional electromagnetic waves, when all of the plurality of switches are open, and wherein a subset of the plurality of radiation portions of the electrically conductive radiation structure are excited by the RF signal provided by the feeding network, when a subset of the plurality of switches are closed for providing directional electromagnetic waves. Advantageously, this allows to selectively provide different radiation patterns with the antenna.

According to a second aspect a wireless communication device is provided comprising one or more antennas according to the first aspect.

In a further possible implementation of the second aspect, the wireless communication device is a Wi-Fi access point or base station.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following identical reference signs refer to identical or at least functionally equivalent features.

DETAILED DESCRIPTION

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of exemplary method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if an exemplary apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
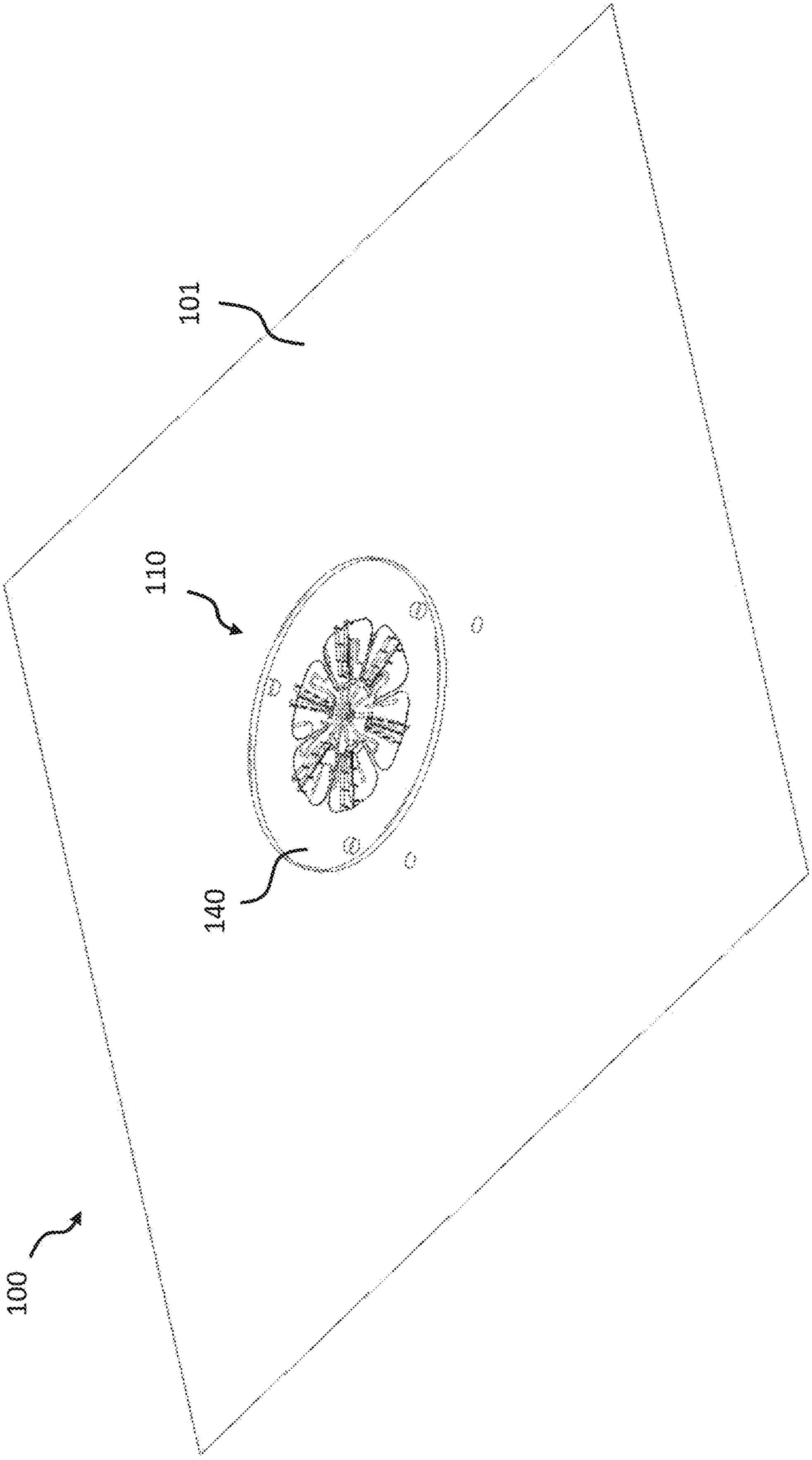
FIG. 1 is a perspective view of an antenna according to an embodiment.

FIG. 1 shows a perspective view of an embodiment of an antenna 100 for a wireless communication device, such as a Wi-Fi access point (sometimes also referred to as base station). Such a Wi-Fi access point may include in addition to the antenna 100 a housing for housing the antenna as well as electronic components for controlling the antenna 100. In an embodiment, such a Wi-Fi access point may be configured to be mounted on the ceiling of a room in order to communicate with Wi-Fi stations within the room, i.e., underneath the Wi-Fi access point. For such an embodiment, FIG. 1 shows a perspective view of the antenna of such an Wi-Fi access point from below.

Figure 2:
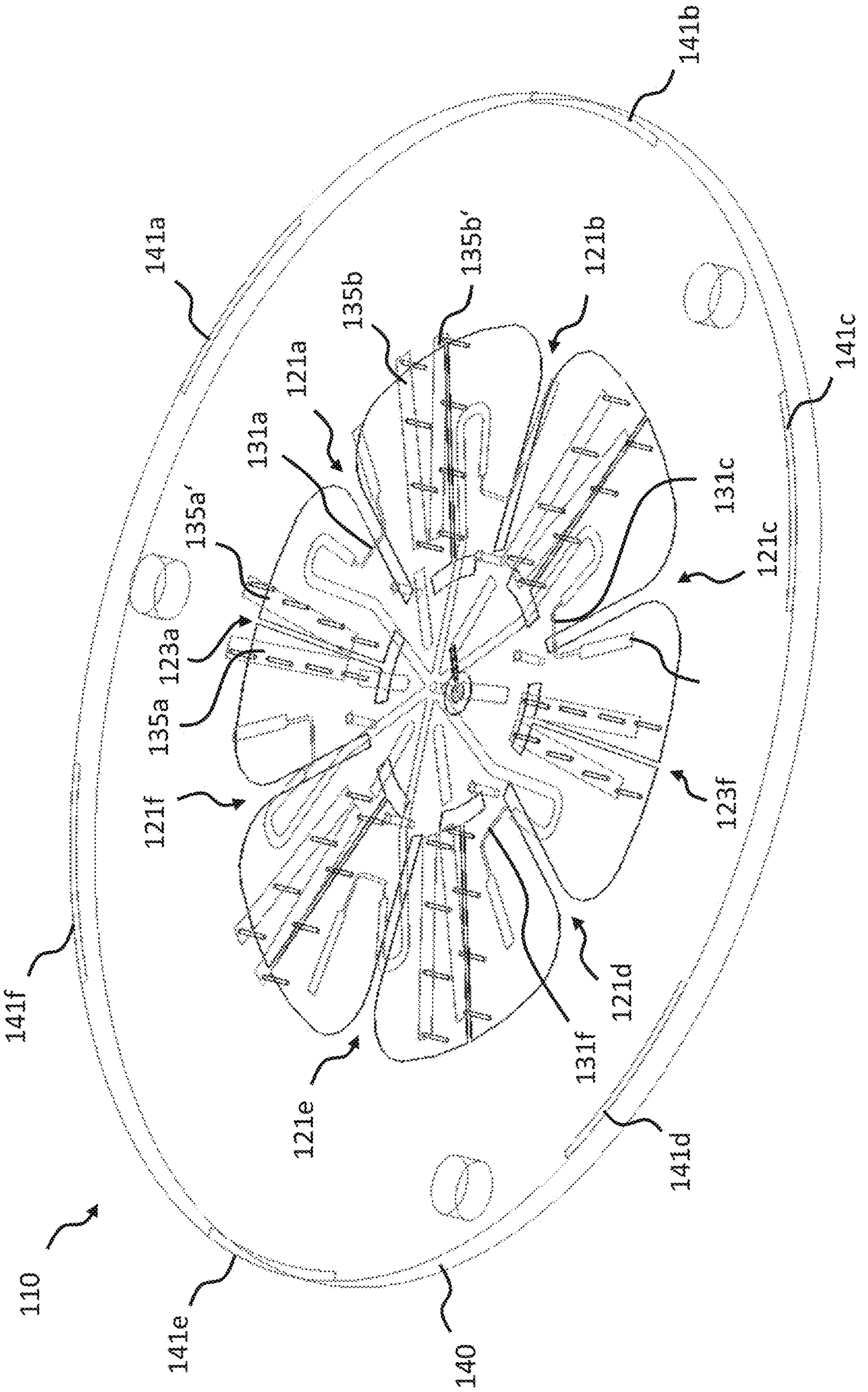
FIG. 2 is a more detailed perspective view a portion of the antenna of FIG. 1.
Figure 3:
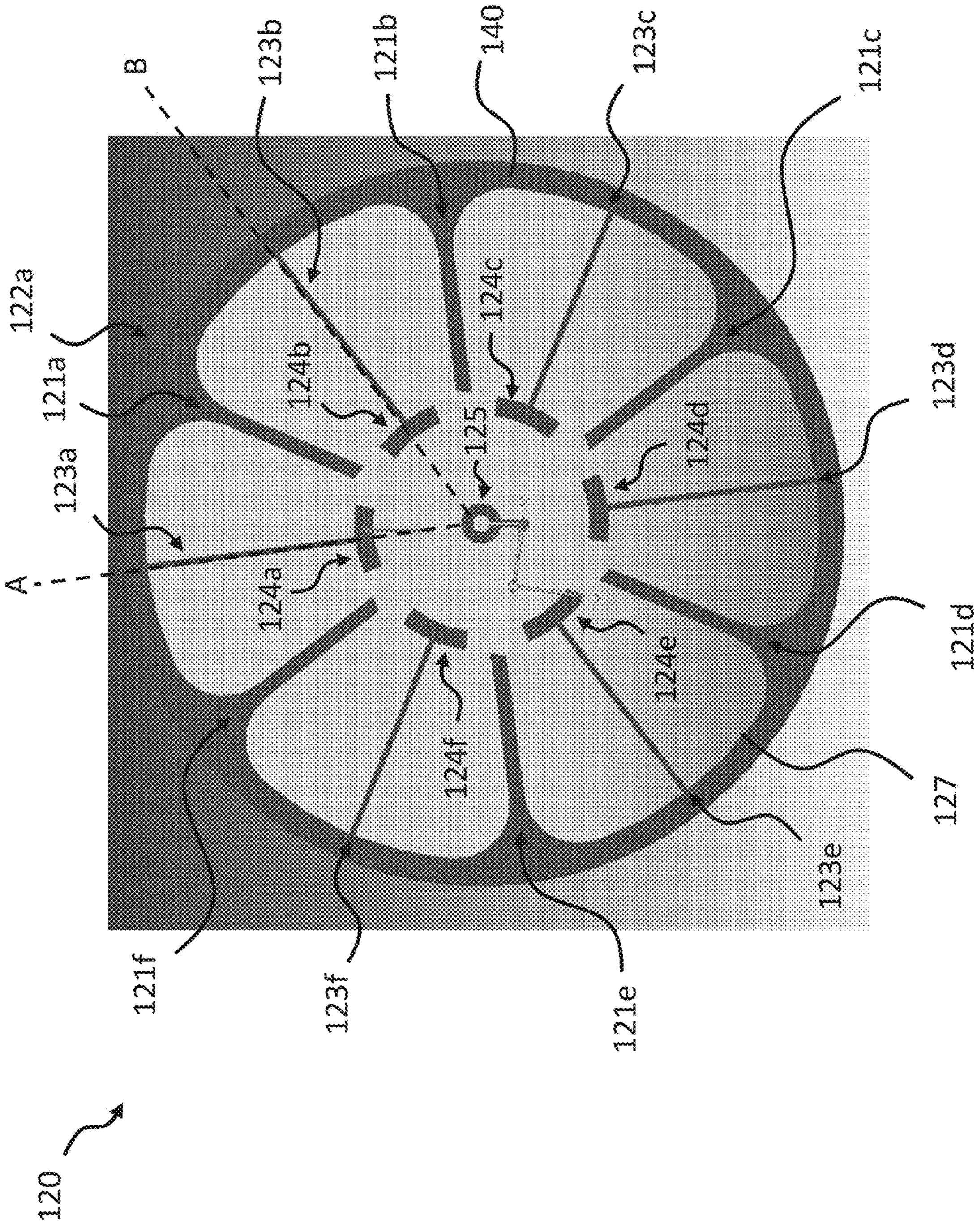
FIG. 3 is a bottom view of the antenna portion of FIG. 2.
Figure 4:
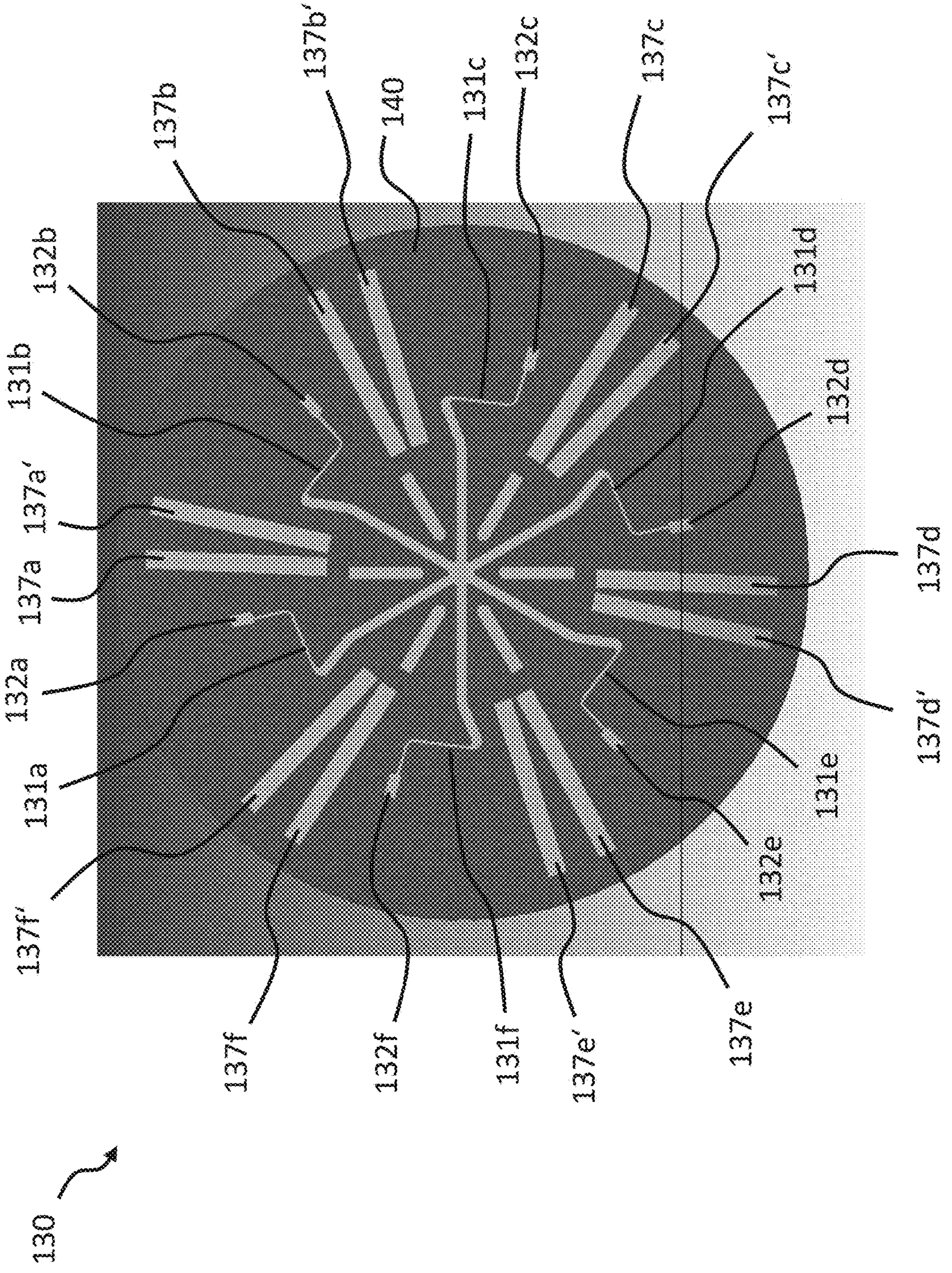
FIG. 4 is a top view of the antenna portion of FIG. 2.

The antenna 100 comprises a first main portion 101 in the form of an electrically conductive grounding structure 101 and a second main portion 110, which is illustrated in more detail in FIGS. 2, 3 and 4 and which comprises an electrically conductive radiation structure 120 and a feeding network 130. As can be taken from FIGS. 1 and 2, the second main portion 110 of the antenna 100 may further comprise an electrically non-conductive substrate 140, wherein the electrically conductive radiation structure 120 and the feeding network 130 are arranged on different sides of the electrically non-conductive substrate 140, which may comprise, for instance, an electrically non-conductive plastic material. In the embodiment shown in FIGS. 1 and 2, the electrically non-conductive substrate 140 substantially has the shape of a circular disk. In an embodiment, the thickness of the electrically non-conductive substrate 140 may be, for instance, in the range from 0.5 to 1.5 mm. In an embodiment, the diameter of the disc-shaped electrically non-conductive substrate 140 may be, for instance, in the range from 40 to 60 mm.

As can be taken in particular from FIGS. 2, 3 and 4 and as will be described in more detail below, the second main portion 110, including the electrically conductive radiation structure 120, the feeding network 130 and the electrically non-conductive substrate 140, may be substantially radially symmetric, wherein the symmetry axis is defined by the central axis of the circular disk-shaped electrically non-conductive substrate 140.

Generally, as will be described in more detail below, the electrically conductive radiation structure 120 is configured to generate electromagnetic waves, the feeding network 130 is configured to feed an RF signal to the electrically conductive radiation structure 120 for generating the electromagnetic waves and the grounding structure 101 is configured to guide the electromagnetic waves generated by the electrically conductive radiation structure 120.

In the embodiment shown in FIG. 1 the guiding function is provided by an electrically conductive grounding structure 101 in the form of a square-shaped metal plate 101, which defines an electrically conductive grounding surface facing the second main portion 110 of the antenna 100. In other embodiments, the shape of the electrically conductive grounding structure 101 and or the shape of the electrically non-conductive substrate 140 may be different to the shapes shown in FIGS. 1 and 2. For instance, the electrically conductive grounding structure 101 may have a circular disk shape as well. As will be appreciated from FIG. 1, the electrically conductive grounding structure 101 may have substantially larger dimensions than the disc-shaped electrically non-conductive substrate 140.

In the perspective view of FIG. 1 the second main portion 110, including the electrically conductive radiation structure 120, the feeding network 130 and the electrically non-conductive substrate 140, is illustrated above the electrically conductive grounding surface defined by the electrically conductive grounding surface 101 in the form of the square-shaped metal plate 101. More specifically, the central axis of the circular disk-shaped electrically non-conductive substrate 140, which as described above may also be the symmetry axis of the electrically conductive radiation structure 120 and/or the feeding network 130, extends through the center of the square-shaped electrically conductive grounding structure 101. In an embodiment, the distance between the electrically non-conductive substrate 140 and the second main portion 110, including the electrically conductive radiation structure 120, the feeding network 130 and the electrically non-conductive substrate 140, along the symmetry axis may be, for instance, in the range from 12 to 30 mm.

As will be described in more detail below, the antenna 100 is configured to emit electromagnetic waves primarily in the direction of the space relative the electrically conductive grounding surface of the electrically conductive grounding structure 101 where the second main portion 110, including the electrically conductive radiation structure 120, the feeding network 130 and the electrically non-conductive substrate 140, is located and beyond. Thus, in an embodiment, where the antenna 100 is a component of a Wi-Fi access point mounted on the ceiling of the room, the antenna is configured to emit electromagnetic waves primarily in the direction of the room below the Wi-Fi access point.

As can be taken in particular from FIGS. 2 and 3, the electrically conductive radiation structure 120 comprises, i.e., defines a plurality of radially extending radiation slots 121*a-f*. In the exemplary embodiment shown in the figures, the electrically conductive radiation structure 120 comprises six radially extending radiation slots 121*a-f*. However, in other embodiments the number of radially extending radiation slots 121*a-f* may be smaller or larger than 6. In an embodiment, the electrically conductive radiation structure 120 comprises at least three radially extending radiation slots 121*a-f*.

In the embodiment shown in the figures the six radially extending radiation slots 121*a-f* are uniformly distributed around the center 125 of the electrically conductive radiation structure 120, which defines the symmetry axis of the second portion 110 of the antenna 100. In other words, for the embodiment with six radially extending radiation slots 121*a-f* two respective adjacent slots define a respective angle of about 60° therebetween. For instance, a first radially extending radiation slot 121*a* and a second radially extending slot 121*b* is about 60°. In other embodiments, however, the radially extending radiation slots 121*a-f* may be distributed around the center 125 of the electrically conductive radiation structure 120 in a non-uniform manner.

Each of the plurality of radially extending radiating slots 121*a-f* has an open outer end at a perimeter 127 of the electrically conductive radiation structure 120. In the embodiment shown in FIGS. 1 to 4, each slot does not extend from its open outer end at the perimeter 127 of the electrically conductive radiation structure 120 completely inward, i.e., up to the center 125 of the electrically conductive radiation structure 120, but to an inner end thereof having a finite inner radius. In an embodiment, the ratio between the maximal outer radius of the perimeter to the inner radius of the inner end of a respective slot 121*a-f* may be, for instance, in the range from 2 to 5. As illustrated, for instance, in FIG. 3, electrically non-conductive material of the electrically non-conductive substrate 140 may fill at least partially the plurality of radially extending radiation slots 121*a-f* defined by the electrically conductive radiation structure 120. Moreover, in an embodiment, the electrically non-conductive substrate 140 may define the outer boundary, i.e., the perimeter 127 of the electrically conductive radiation structure 120.

As can be taken in particular from FIG. 3, each radially extending radiation slot 121*a-f* defines a radiation portion of the electrically conductive radiation structure 120. For instance, the first radially extending radiation slot 121*a* defines a first radiation portion 122*a* of the electrically conductive radiation structure 120, which in the top view of FIG. 3 is bounded by the notional lines A and B. For the sake of clarity only the radiation portion 122*a* defined by the first radially extending radiation slot 121*a* is illustrated in FIG. 3. As will be appreciated, however, five additional radiation portions are defined by the other radially extending radiation slots 121*b-f*. In the embodiment shown in the figures, the plurality of radiation portions of the electrically conductive radiation structure 120 are coplanar, i.e., extend in the same plane. As can be taken from FIG. 1 this plane, i.e., the common plane of the plurality of radiation portions of the electrically conductive radiation structure 120, may be substantially parallel to the electrically conductive grounding surface defined by the electrically conductive grounding structure 101. Thus, the electrically conductive grounding surface defined by the electrically conductive grounding structure 101 is spaced from and faces the plurality of radiation portions of the electrically conductive radiation structure 120 for guiding the electromagnetic waves emitted by the plurality of radiation portions, such as the radiation portion 122*a* of the electrically conductive radiation structure 120.

In an embodiment, the electrically conductive radiation structure 120 further defines a plurality of radially extending de-coupling slots 123*a-f* for de-coupling the plurality of radiation portions, such as the first radiation portion 122*a* of the electrically conductive radiation structure 120. For instance, a first radially extending de-coupling slot 123*a* and a second radially extending de-coupling slot 123*b* de-couples the radiation portion 122*a* bounded by the notional lines A and B from the neighbouring radiation portions defined by the radially extending radiation slots 121*b* and 121*f*, respectively. As can be taken from FIG. 3, like the plurality of radially extending radiation slots 121*a-f* the plurality of radially extending de-coupling slots may be distributed uniformly around the centre 125 of the electrically conductive radiation structure 120. Thus, in the embodiment shown in FIG. 3 with six radially extending de-coupling slots 123*a-f* two respective adjacent slots define a respective angle of about 60° therebetween. Thus, the embodiment shown in FIG. 3, each radially extending de-coupling slot 123*a-f* is arranged half-way between two adjacent radially extending radiation slots 121*a-f*.

In the embodiment shown in the figures, each of the radially extending de-coupling slots 123*a-f* has an open outer end at the perimeter 127 of the electrically conductive radiation structure 120 and extends to a finite inner radius. As can be taken, for instance, from FIG. 3, the inner radius of each of the plurality of radially extending de-coupling slots 123*a-f* may be similar to the inner radius of each of the plurality of radially extending radiation slots 121*a-f*. In an embodiment, the inner radius of the plurality of radially extending de-coupling slots 123*a-f* may be, for instance, in the range from 5 to 8 mm. In an embodiment, the inner radius of the plurality of radially extending radiation slots 121*a-f* may be, for instance, in the range from 6 to 9 mm.

As illustrated in FIG. 3, the width of each of the plurality of radially extending de-coupling slots 123*a-f* may be smaller than the width of each of the plurality of radially extending radiation slots 121*a-f*. In an embodiment, the width of each of the plurality of radially extending de-coupling slots 123*a-f* may be, for instance, in the range from 0.3 to 1 mm. In an embodiment, the width of each of the plurality of radially extending radiation slots 121*a-f* may be, for instance, in the range from 0.5 to 1.2 mm.

In an embodiment, the electrically conductive radiation structure may further define a respective recess 124*a-f* at a respective inner radius of a respective radially extending de-coupling slot 123*a-f*, wherein each recess 124*a-f* has a width larger than a width of the respective radially extending de-coupling slot 123*a-f*. As in the case of the plurality of radiation slots 121 electrically non-conductive material of the electrically non-conductive substrate 140 may fill at least partially the plurality of radially extending de-coupling slots 123*a-f* defined by the electrically conductive radiation structure 120, including the plurality of recesses 124*a-f* defined at the inner ends thereof. In an embodiment, the dimensions of each respective recess 124*a-f* may be, for instance, in the range from 0.2 to 2 mm.

The feeding network 130, which is illustrated in more detail in FIG. 4, comprises a plurality of feeding arms 131*a-f* configured to feed a RF signal into each of the plurality of radiation portions, such as the radiation portion 122*a*, of the electrically conductive radiation structure 120 for exciting each of the radiation portions and, thus, the radially extending radiation slots 121*a-f* to emit electromagnetic waves based on the RF input signal. As can be taken from FIG. 4, the plurality of feeding arms 131*a-f* are connected at a common center, i.e., a feeding port of the feeding network 130, which in the embodiment shown in the figures is arranged on the symmetry axis of the antenna 100. Further electronic components of the antenna 100 (not shown in the figures) feed the RF input signal into the feeding port at the center of the feeding network 130. From there the RF input signal propagates along the respective feeding arms 131*a-f* in an outward direction. As the RF signal travels from the feeding port at the center along the respective feeding arms 131*a-f* outwards it is coupled into the respective radiation portion of the electrically conductive radiation structure 120 and, thereby, excites the respective radiation portion, such as the radiation portion 122*a* to emit electromagnetic waves based on the RF signal. In other words, each of the plurality of feeding arms 131*a-f* may be arranged and/or configured such that at least a feeding arm portion of each feeding arm 131*a-f* is inductively or galvanically coupled to a respective radiation portion of the electrically conductive radiation structure 120 for exciting the respective radiation portion to emit electromagnetic waves.

As can be taken from FIG. 2, each feeding arm 131*a-f* may have a feeding arm portion, which extends substantially perpendicular to a respective radially extending radiation slot 121*a-f* and is configured to couple the RF signal into the respective radiation portion of the electrically conductive radiation structure 120 and thereby excite the respective radiation portion. For instance, in the perspective view shown in FIG. 2, the feeding arm 131*a* has a portion extending underneath of and perpendicular to the radially extending radiation slot 121*a*. Although material of the electrically non-conductive substrate 140 is located between the feeding arm 131 and the radiation portion 122*a* defined by the radially extending radiation slot 121*a*, the feeding arm 131 inductively couples the RF signal into the radiation portion 122*a* defined by the radially extending radiation slot 121*a*. Thereby, the radiation portion 122*a* defined by the radially extending radiation slot 121*a* is excited to emit electromagnetic waves in response to the RF signal. As already described above, the electromagnetic waves generated by the radiation portion 122*a* (as well as the other radiation portions of the electrically conductive radiation structure 120) in response to the RF signal are guided, in particular reflected by the electrically conductive grounding surface defined by the electrically conductive grounding structure 101 in the form of the square-shaped metal plate 101.

As illustrated in FIG. 4, at the respective outer end of each of the plurality of feeding arms 131*a-f* a respective grounding contact 132*a-f* may be provided. The purpose of the respective grounding contact 132*a-f* is to connect the respective feeding arm 131*a-f* to the ground.

In an embodiment, the antenna 100 may further comprise for each radially extending de-coupling slot 123*a-f* one or more metal strips 137*a-f*, 137*a*'-f, which are arranged to extend radially adjacent to a respective radially extending de-coupling slot 123*a-f*. As can be taken from the embodiment shown in FIG. 4, the antenna 100 may comprise two metal strips for each radially extending de-coupling slot 123*a-f*, which are affixed to the substrate 140 on the same side as the feeding network 130. Thereby, the metal strips 137*a-f*, 137*a*'-f may improve the de-coupling effect provided by the plurality of radially extending de-coupling slots 123*a-f* of the electrically conductive radiation structure 120.

As can be taken from FIG. 2, in an embodiment, the antenna 100 may further comprise for each radially extending radiation slots 121*a-f* a plurality of electrically conductive guiding elements 141*a-f* configured to guide the electromagnetic waves emitted by the plurality of radiation portions of the electrically conductive radiation structure 120. In the embodiment shown in FIG. 2, a respective guiding element 141*a-f* is arranged along the radially outward extension of a respective radially extending radiation slot 121*a-f*. Each guiding element 141*a-f* may be arranged at the outer rim of the substrate 140 and on the same side of the substrate 140 as the electrically conductive radiation structure 120.

Figure 5B:
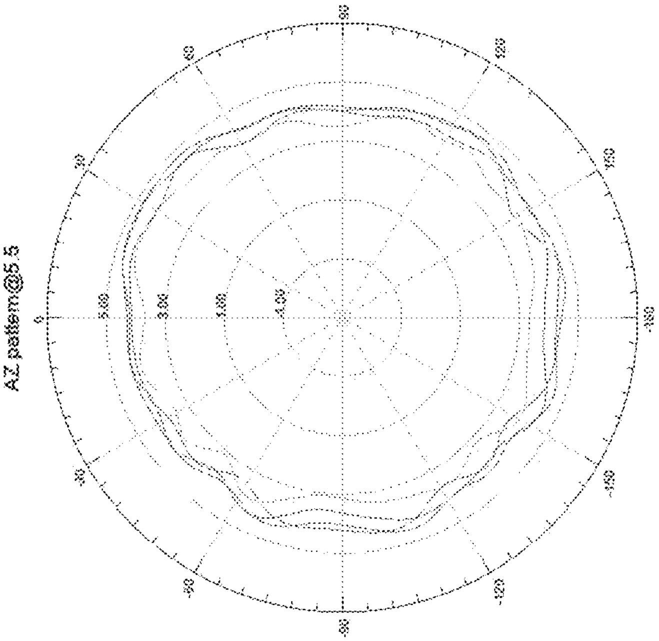
FIG. 5*b* is a cross-sectional view of the radiation pattern of FIG. 5*a* for a constant elevation angle.
Figure 5A:
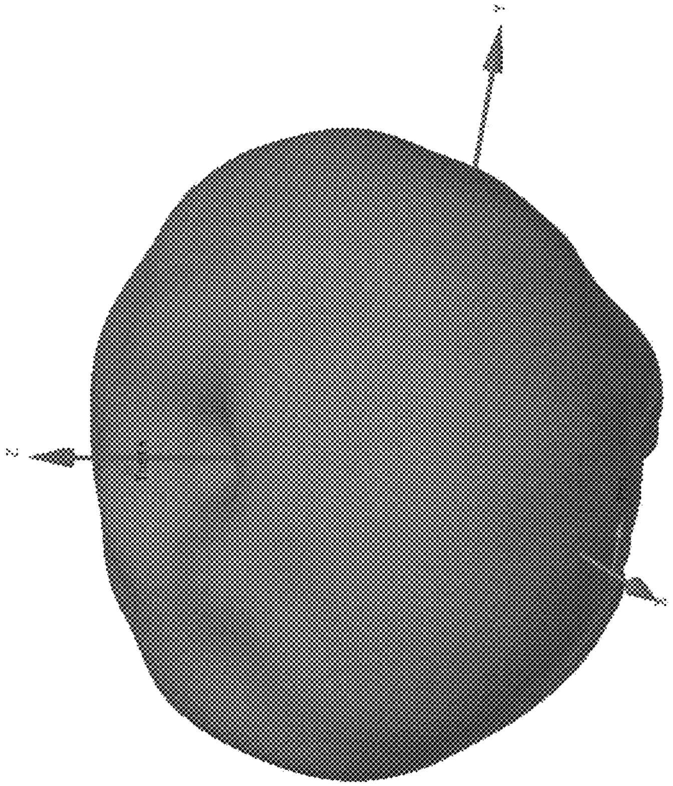
FIG. 5*a* is a perspective view of a radiation pattern of an antenna according to an embodiment.

FIG. 5*a* is a perspective view of a radiation pattern of the antenna 100 described above in the context of FIGS. 1 to 4. FIG. 5*b* is a cross-sectional view of the radiation pattern of FIG. 5*a* for a constant elevation angle, i.e., an azimuth pattern at an angle of 60° relative to the vertical axis.

In further embodiments shown in the following figures, the feeding network 130 may further comprise a plurality of switches which allow to selectively couple or de-couple one or more of the plurality of radiation portions of the electrically conductive radiation structure 120 to/from the feeding network 130 and, thereby, produce a more directed radiation pattern in comparison to the radiation pattern shown in FIGS. 5*a* and 5*b*, which is substantially constant with respect to the horizontal azimuth angle (as can be taken from FIG. 5*b*).

Figure 6B:
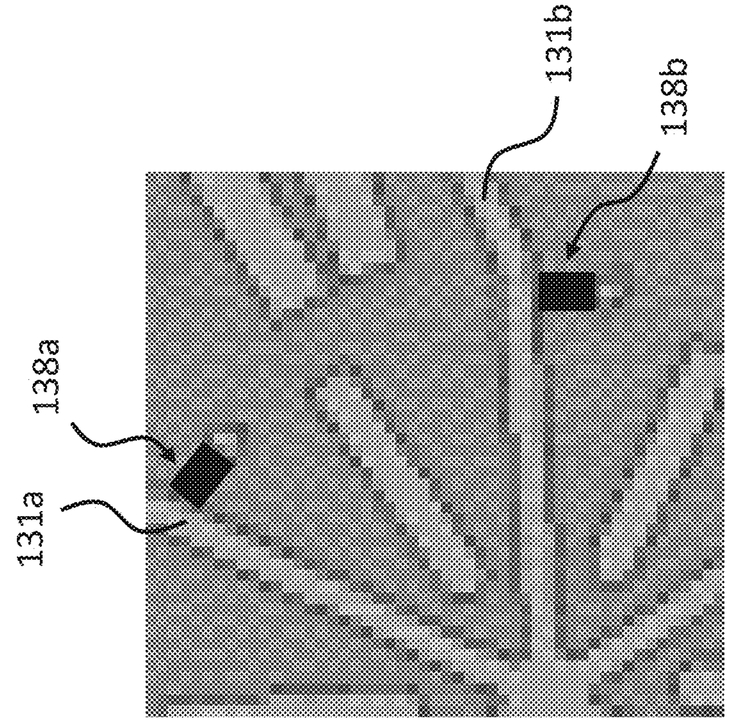
FIG. 6*b* is a more detailed view of a portion of the feeding network of FIG. 6*a;*
Figure 6A:
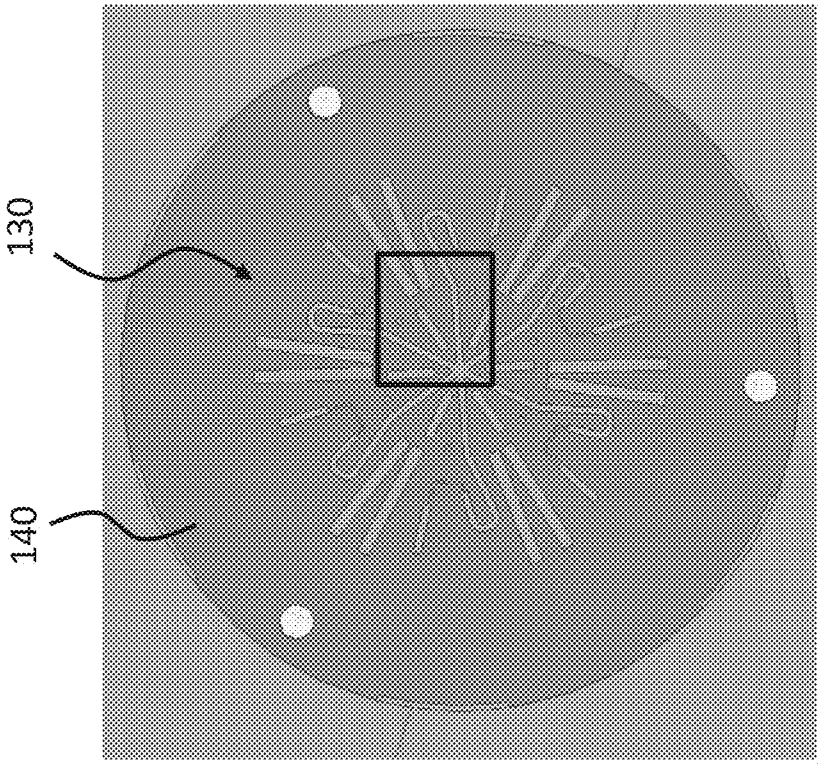
FIG. 6*a* is a top view of a feeding network of an antenna according to an embodiment including switches in parallel.
Figure 7A:
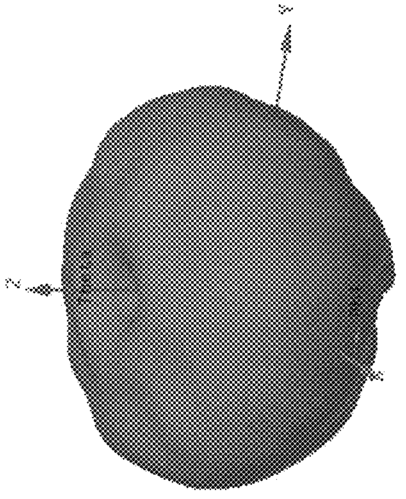
FIGS. 7*a-d* show for the embodiment of the feeding network of FIGS. 6*a* and 6*b* a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 7B:
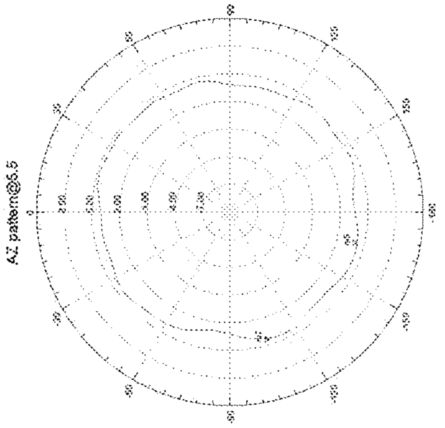
Figure 7C:
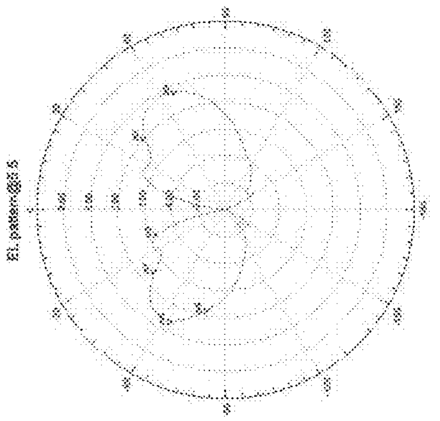
Figure 7D:
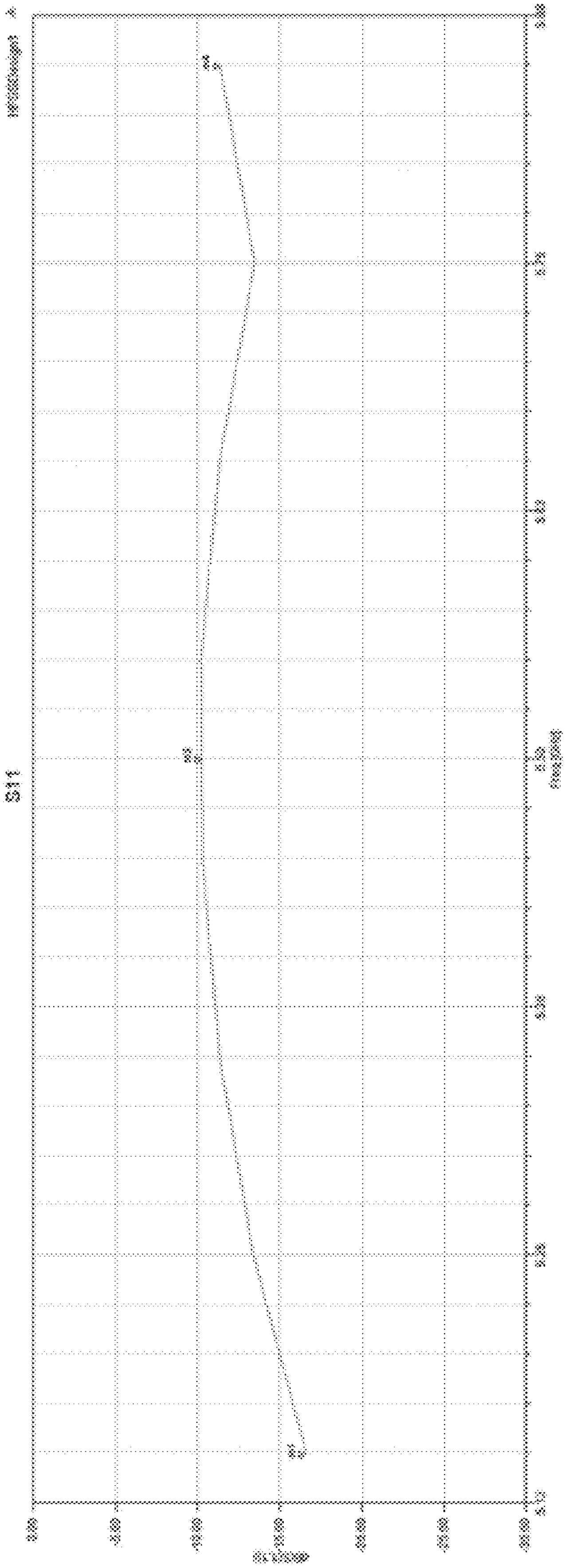

A first embodiment of the feeding network 130 using a plurality of switches 138*a, b* in parallel for selectively generating different directional radiation patterns is illustrated in FIGS. 6*a* and 6*b*, which show a bottom view of the feeding network 130 of the antenna 100 arranged on one side of the support 140 and a more detailed view of a portion thereof (illustrated by the rectangle in FIG. 6*a*). For the sake of clarity FIGS. 6*a* and 6*b* only explicitly shows two switches 138*a, b* for two of the feeding arms 131*a, b*. It will be appreciated, however, that according to an embodiment a switch, such as the switches 138*a, b* explicitly shown in FIGS. 6*a* and 6*b*, may be provided for each of the feeding arms 131*a-f* of the feeding network 130. FIGS. 7*a-d* show for such an embodiment of the feeding network of FIGS. 6*a* and 6*b*, i.e., where a switch is provided for each of the feeding arms 131*a-f* and all switches are open, i.e., inactive, a perspective view of the radiation pattern, a cross-sectional view of the radiation pattern for a constant elevation angle, a cross-sectional view of the radiation pattern for a constant azimuth angle and a graph illustrating the antenna matching as a function of frequency.

For the embodiment shown in FIGS. 6*a* and 6*b* each switch, including the switches 138*a, b* explicitly shown, is electrically connected to the electrically conductive grounding surface 101, e.g., by means of a grounding pad in parallel to a respective feeding arm 131*a-f* of the feeding network 130. In other words, in case a switch 138*a, b* is closed, i.e., active, the RF signal is shortened via the respective switch 138*a, b* to the grounding structure 101 and, thus, does not propagate along the respective feeding arm 131*a-f* so that consequently the respective feeding arm 131*a-f* does not excite the respective radiation portion of the radiation structure 120. Thus, in an embodiment, all of the plurality of radiation portions, including the radiation portion 124*a* of the electrically conductive radiation structure 120 are excited by the RF signal provided by the feeding network 130, when all of the plurality of parallel switches 138*a, b* are open (as shown in FIGS. 7*a-d*), wherein only a subset (as will be described in more detail further below in the context of the embodiment shown in FIGS. 8 and 9*a-d*) of the plurality of radiation portions of the electrically conductive radiation structure 120 are excited by the RF signal provided by the feeding network 130, when a subset of the plurality of parallel switches 138*a, b* are closed, i.e., active. Each switch 138*a, b* may comprise, for instance, a diode.

Figure 8:
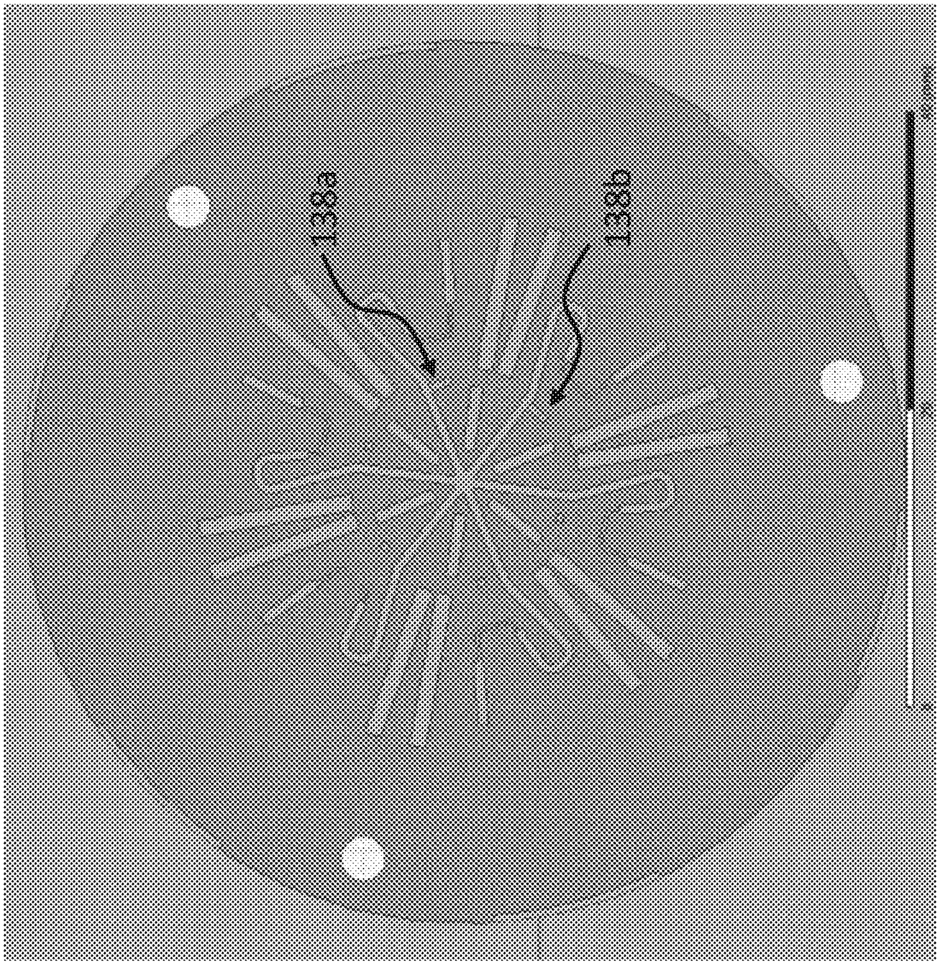
FIG. 8 shows the feeding network of FIG. 6*a* with two switches closed and the other switches open.
Figure 9C:
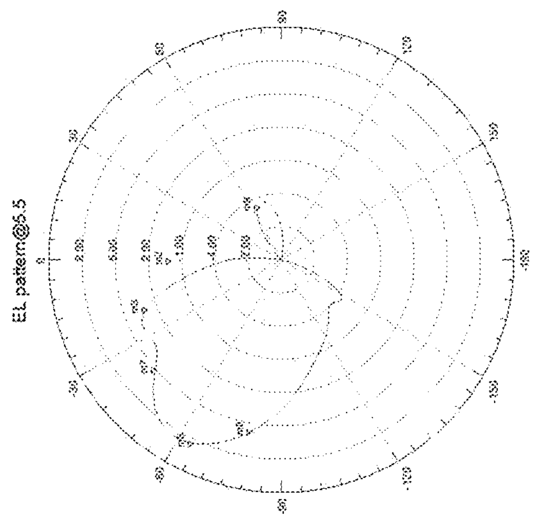
FIGS. 9*a-d* show for the embodiment of the feeding network of FIG. 8 a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 9B:
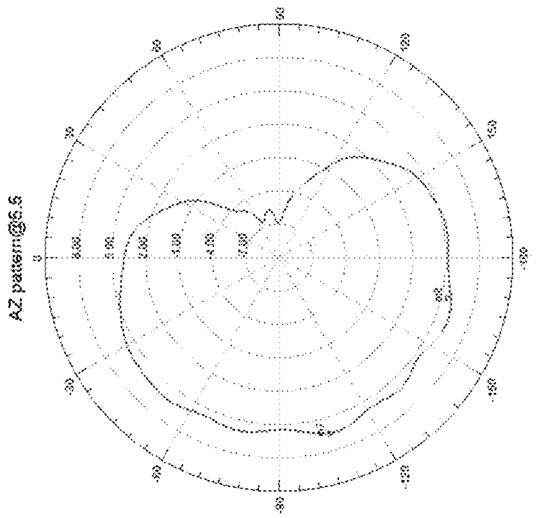
Figure 9A:
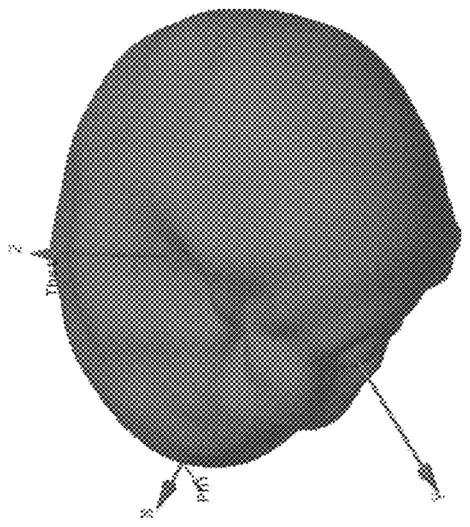
Figure 9D:
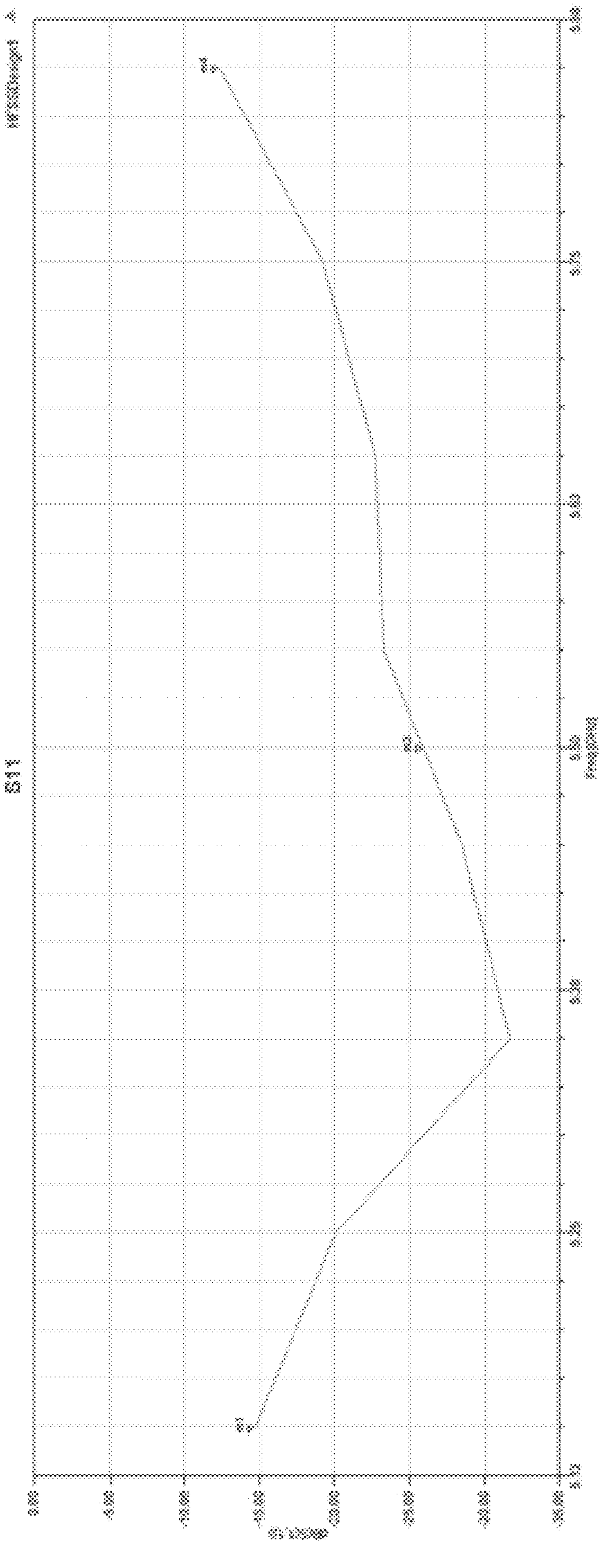

FIG. 8 shows the feeding network 130 of FIG. 6*a* with two switches 138*a, b* closed and the other switches open. FIGS. 9*a-d* show for the embodiment of the feeding network 130 of FIG. 8 a perspective view of the radiation pattern, a cross-sectional view of the radiation pattern for a constant elevation angle, a cross-sectional view of the radiation pattern for a constant-azimuth angle and a graph illustrating the antenna matching as a function of frequency. As will be appreciated, because only two of the switches, namely the switches 138*a, b* are closed, the radiation patterns shown in FIGS. 9*a-c* are more directive than the radiation patterns shown for the "omni-directional" case in FIGS. 7*a-c.*

Figure 10:
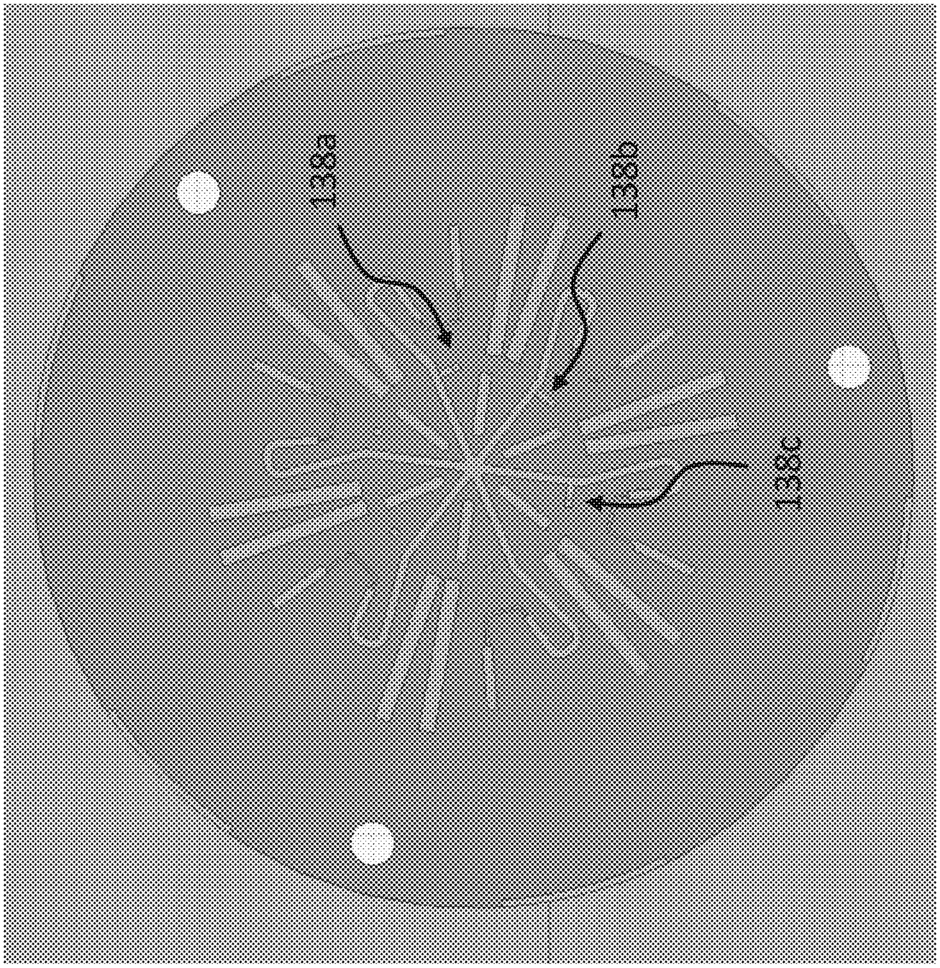
FIG. 10 shows the feeding network of FIG. 6*a* with three switches closed and the other switches open.
Figure 11C:
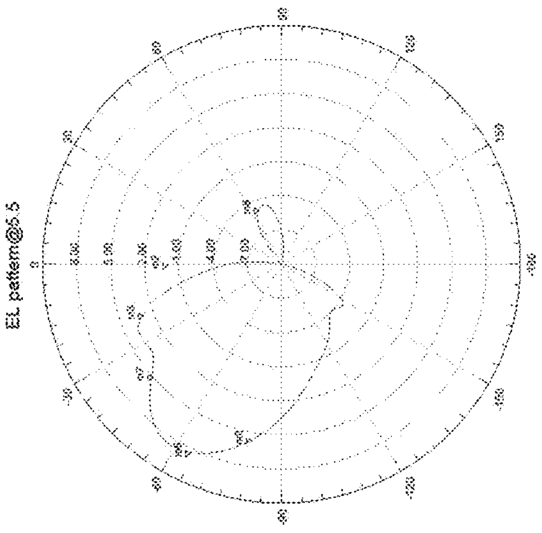
FIGS. 11*a-d* show for the embodiment of the feeding network of FIG. 10 a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 11B:
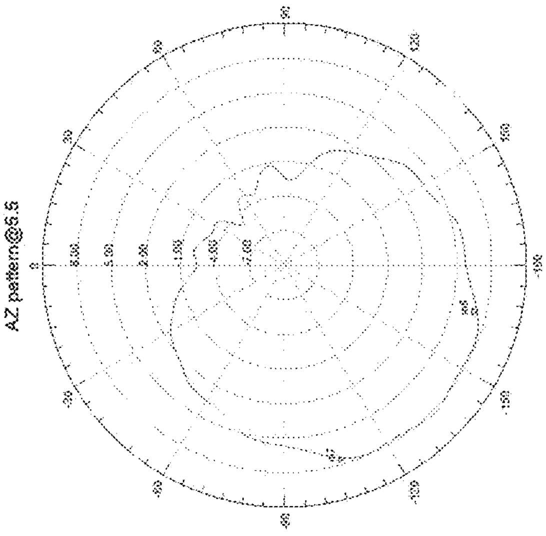
Figure 11A:
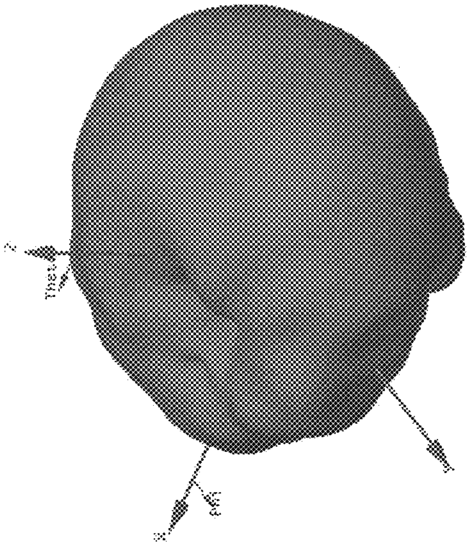
Figure 11D:
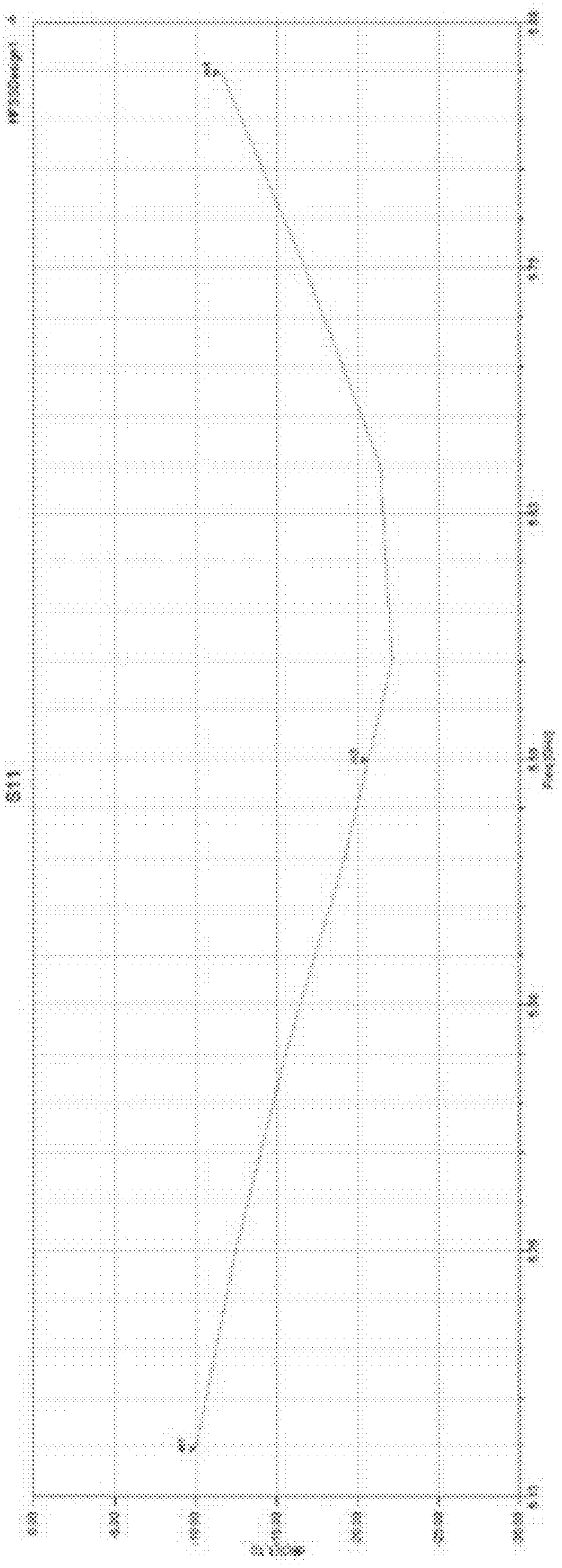

FIG. 10 shows the feeding network 130 of FIG. 6*a* with three switches 138*a-c* closed and the other switches open. FIGS. 11*a-d* show for the embodiment of the feeding network 130 of FIG. 10 a perspective view of the radiation pattern, a cross-sectional view of the radiation pattern for a constant elevation angle, a cross-sectional view of the radiation pattern for a constant azimuth angle and a graph illustrating the antenna matching as a function of frequency. As will be appreciated, because half of the switches, namely the switches 138*a-c* are closed, the radiation patterns shown in FIGS. 11*a-c* are more directive than the radiation patterns shown for the "omni-directional" case in FIGS. 7*a-c*, but less directive than the radiation patterns shown in FIGS. 9*a-c* for the case of two switches 138*a, b* closed.

Figure 12B:
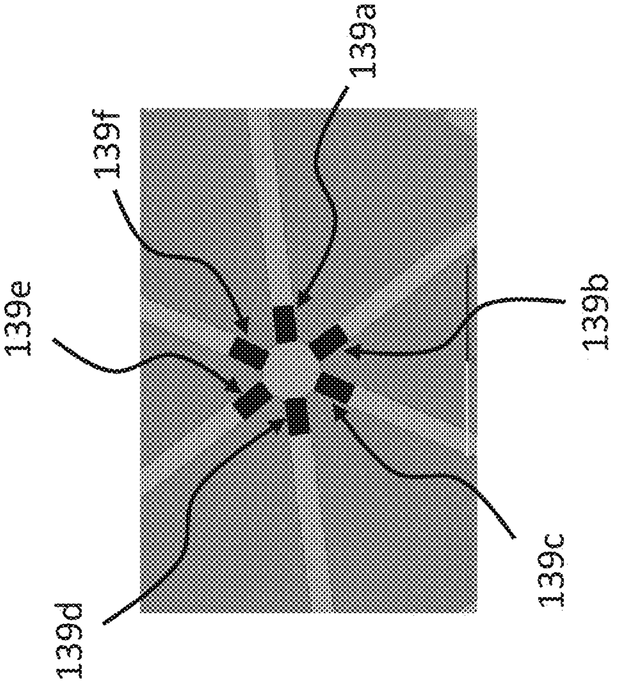
FIG. 12*b* is a more detailed view of a portion of the feeding network of FIG. 12*a;*
Figure 12A:
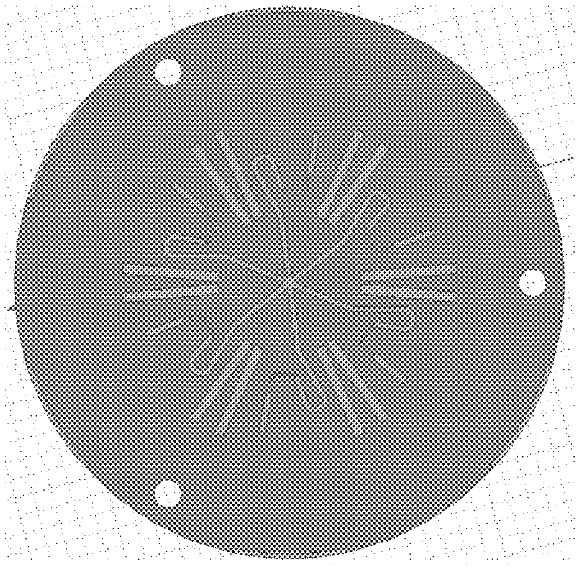
FIG. 12*a* is a top view of a feeding network of an antenna according to an embodiment including switches in series.
Figure 13C:
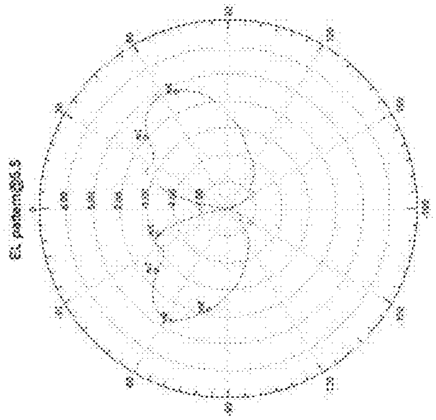
FIGS. 13*a-d* show for the embodiment of the feeding network of FIGS. 12*a* and 12*b* a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 13B:
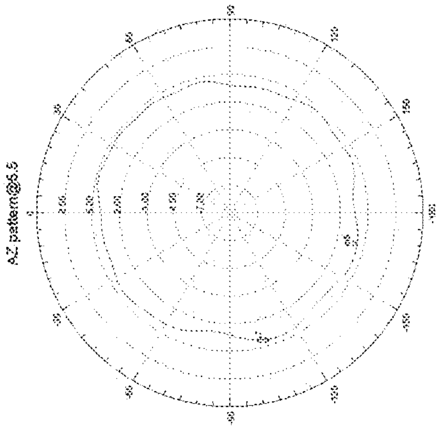
Figure 13A:
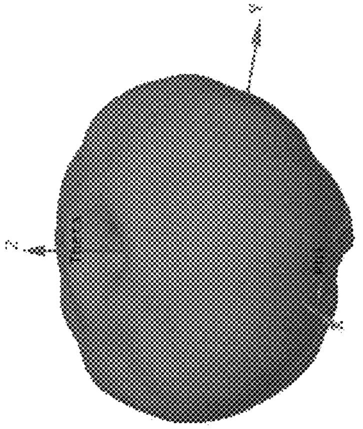
Figure 13D:
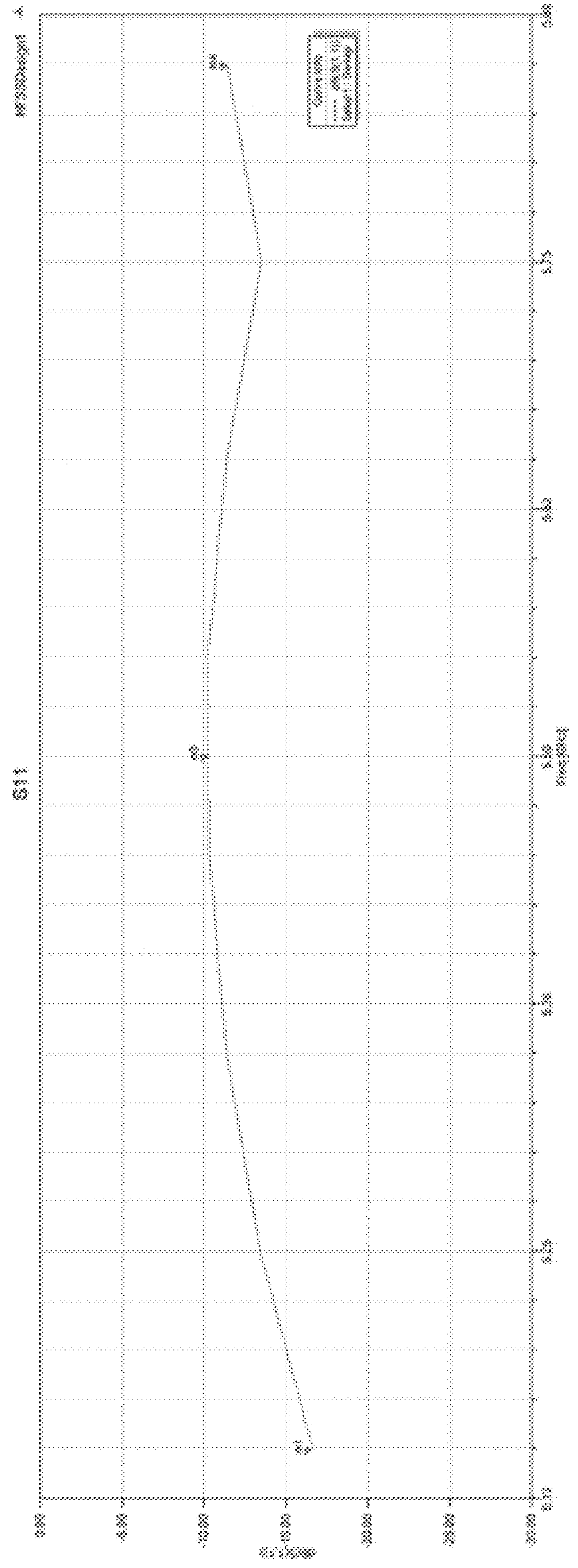

A further embodiment of the feeding network 130 using a plurality of switches 139*a-f* not in parallel (as in the previous embodiments), but in series for selectively generating different directional radiation patterns is illustrated in FIGS. 12*a* and 12*b*, which show a bottom view of the feeding network 130 of the antenna 100 arranged on one side of the support 140 and a more detailed view of the central portion thereof. FIGS. 13*a-d* show for the embodiment of the feeding network of FIGS. 12*a* and 12*b* a perspective view of the radiation pattern, a cross-sectional view of the radiation pattern for a constant elevation angle, a cross-sectional view of the radiation pattern for a constant azimuth angle and a graph illustrating the antenna matching as a function of frequency.

For the embodiment shown in FIGS. 12*a* and 12*b* each switch 139*a-f* is arranged in series between the feeding port at the center of the feeding network 130 and a respective feeding arm 131*a-f.* In other words, in case a switch 139*a-f* is closed, i.e., active, the RF signal propagates along the respective feeding arm 131*a-f* so that consequently the respective feeding arm 131*a-f* excites the respective radiation portion of the radiation structure 120, as described in great detail further above. Thus, in an embodiment, all of the plurality of radiation portions, including the radiation portion 124*a* of the electrically conductive radiation structure 120 are excited by the RF signal provided by the feeding network 130, when all of the plurality of switches 139*a-f* are closed, i.e., active, while only a subset of the plurality of radiation portions of the electrically conductive radiation structure 120 are excited by the RF signal provided by the feeding network 130, when a subset of the plurality of switches 139*a-f* are open (as will be described in more detail further below in the context of the embodiment shown in FIGS. 14 and 15*a-d* as well as the embodiment shown in FIGS. 16 and 17*a-d*). Each switch 139*a-f* may comprise, for instance, a diode.

Figure 14:
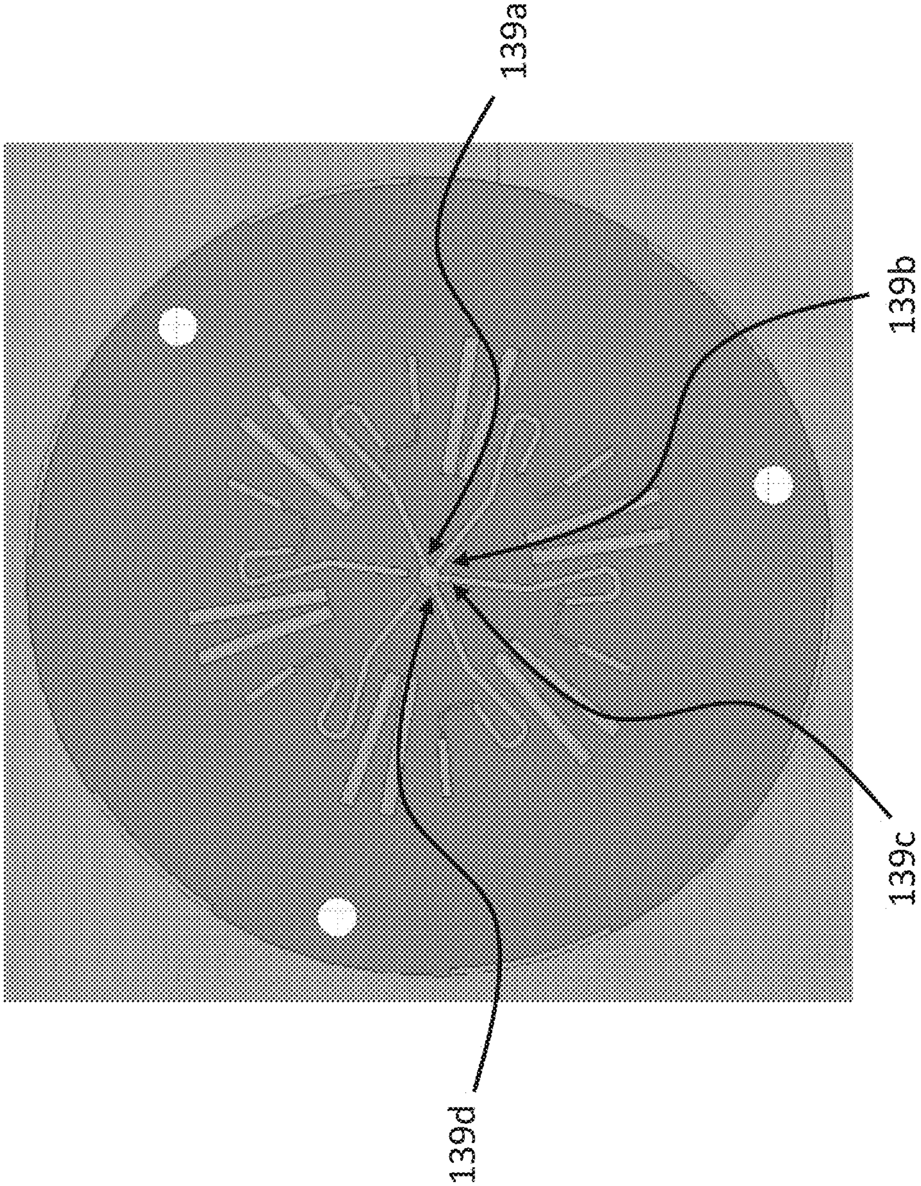
FIG. 14 shows the feeding network of FIG. 12*a* with four switches closed and the other switches open.
Figure 15C:
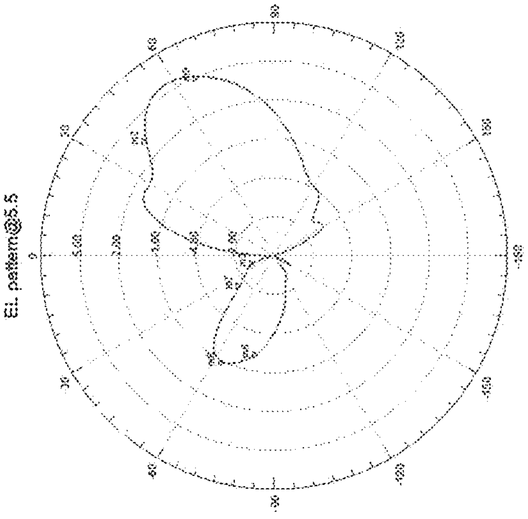
FIGS. 15*a-d* show for the embodiment of the feeding network of FIG. 14 a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 15B:
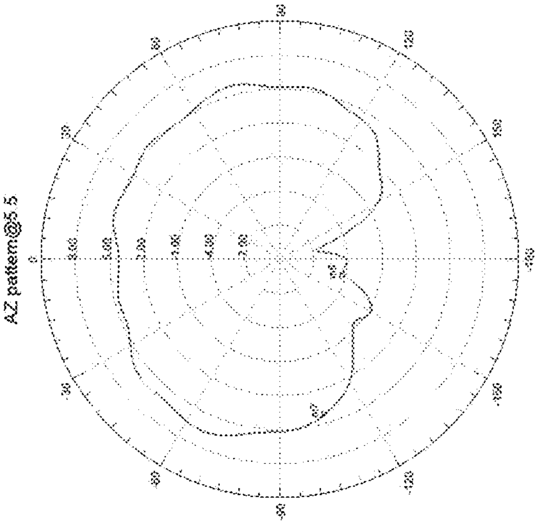
Figure 15A:
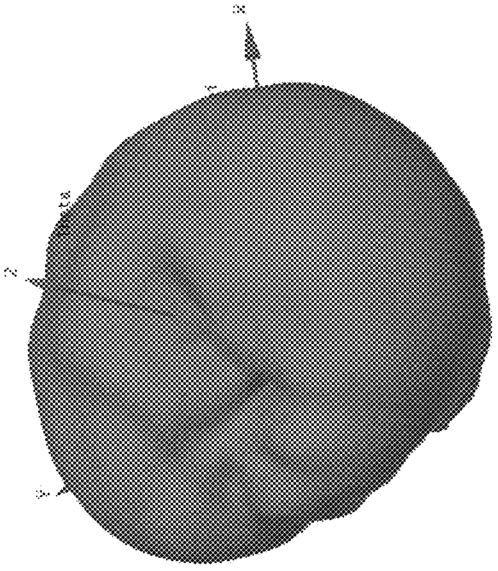
Figure 15D:
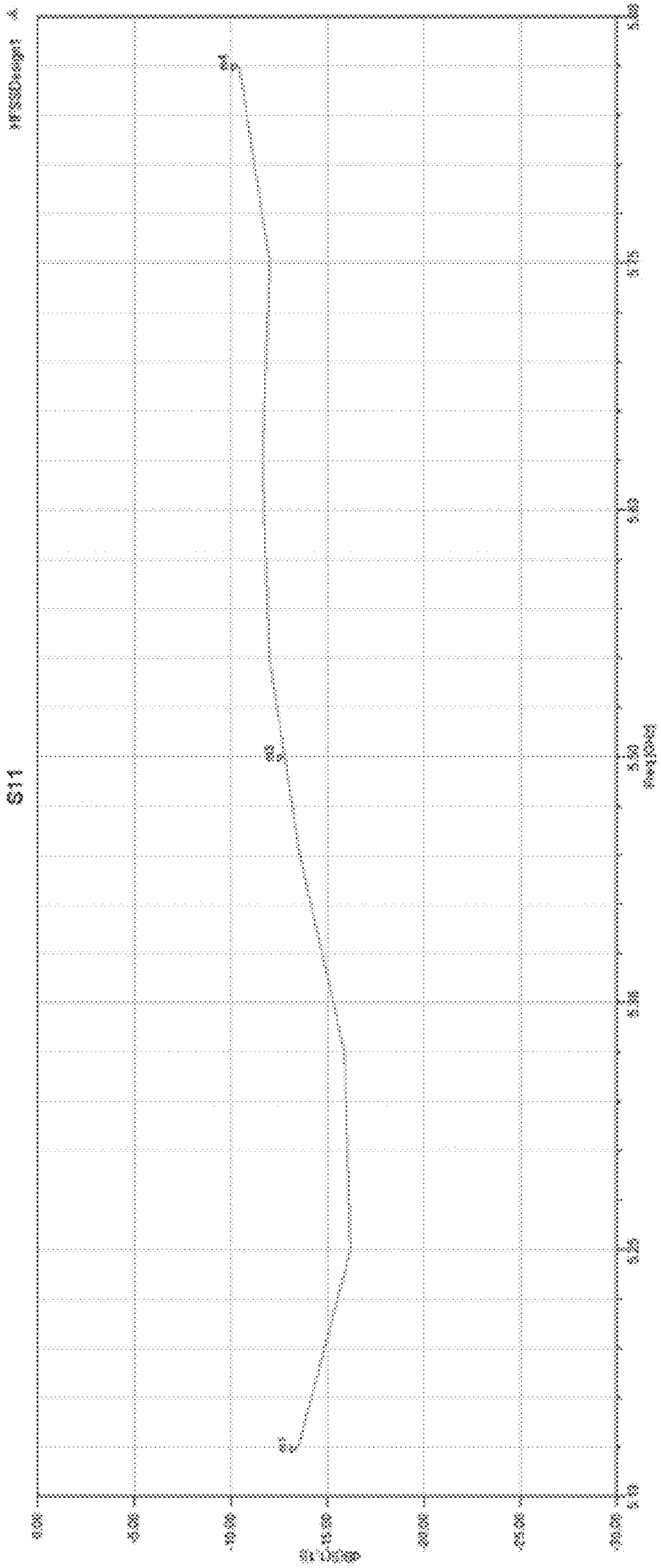

FIG. 14 shows the feeding network 130 of FIG. 12*a* with four switches 139*a-d* closed and the other switches 139*e*, 139*f* open. FIGS. 15*a-d* show for the embodiment of the feeding network 130 of FIG. 14 a perspective view of the radiation pattern, a cross-sectional view of the radiation pattern for a constant elevation angle, a cross-sectional view of the radiation pattern for a constant azimuth angle and a graph illustrating the antenna matching as a function of frequency. As will be appreciated, because four of the switches, namely the switches 139*a-d* are closed, the radiation patterns shown in FIGS. 15*a-c* are more directive than the radiation patterns shown for the "omni-directional" case in FIGS. 13*a-c*, namely in the directions defined by the switches 139*a-d.*

Figure 16:
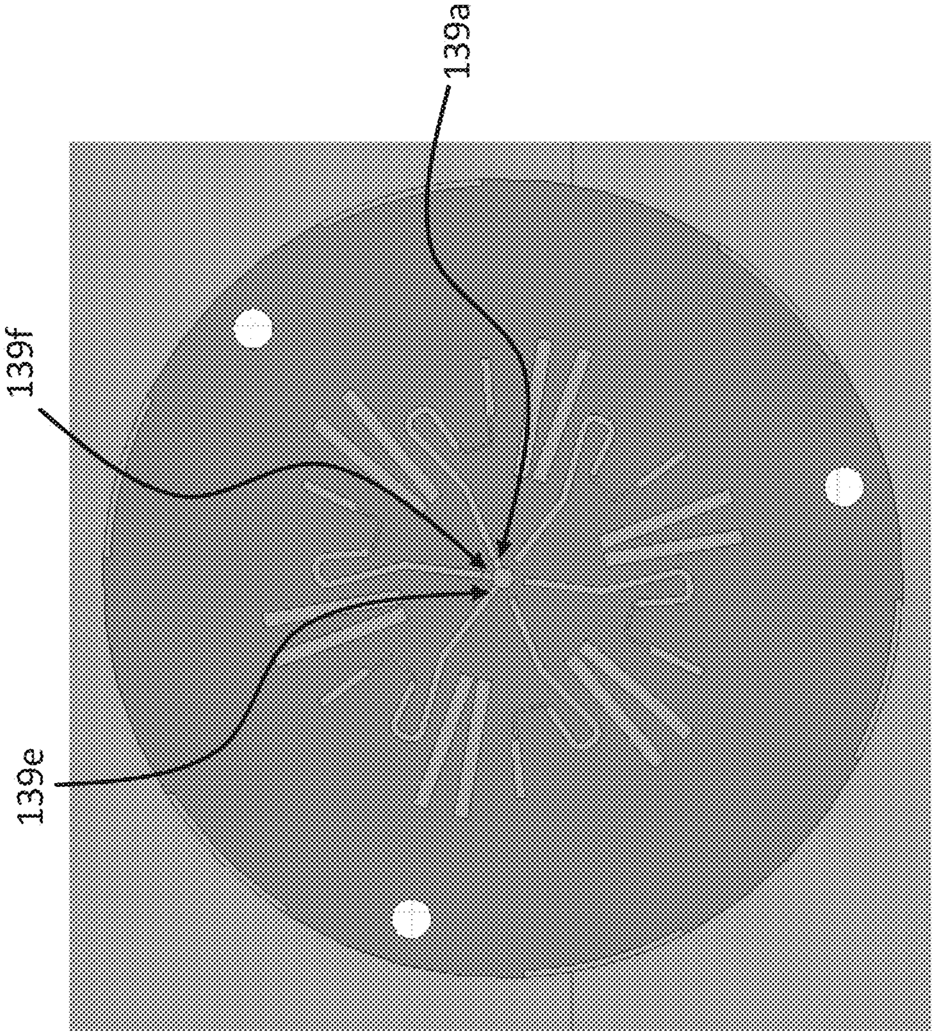
FIG. 16 shows the feeding network of FIG. 12*a* with three switches closed and the other switches open.
Figure 17A:
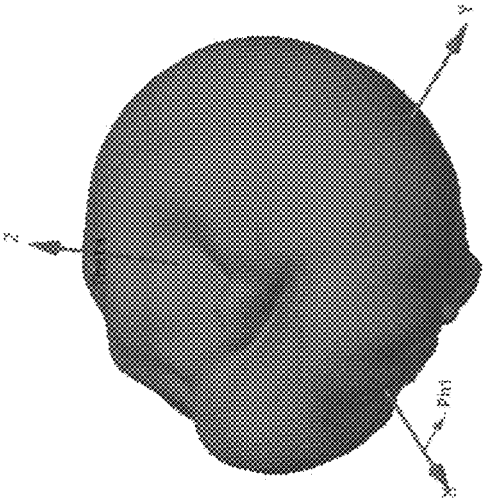
FIGS. 17*a-d* show for the embodiment of the feeding network of FIG. 16 a perspective view of the radiation pattern, a cross-sectional view of the radiation pattern for a constant azimuth angle, a cross-sectional view of the radiation pattern for a constant elevation angle and a graph illustrating the antenna matching as a function of frequency.
Figure 17B:
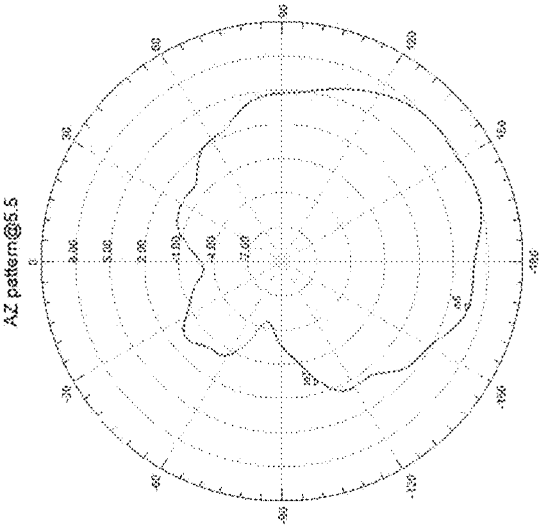
Figure 17C:
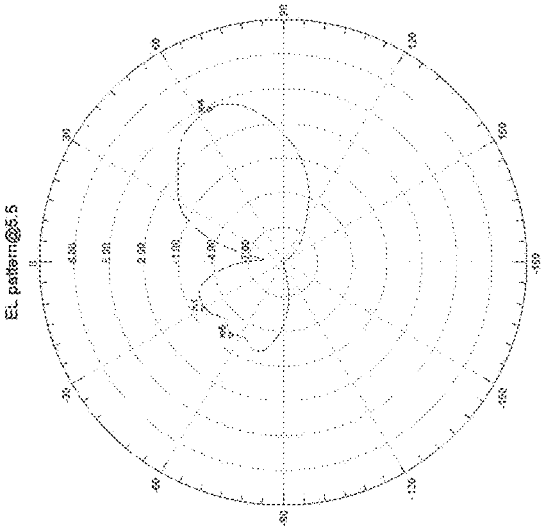
Figure 17D:
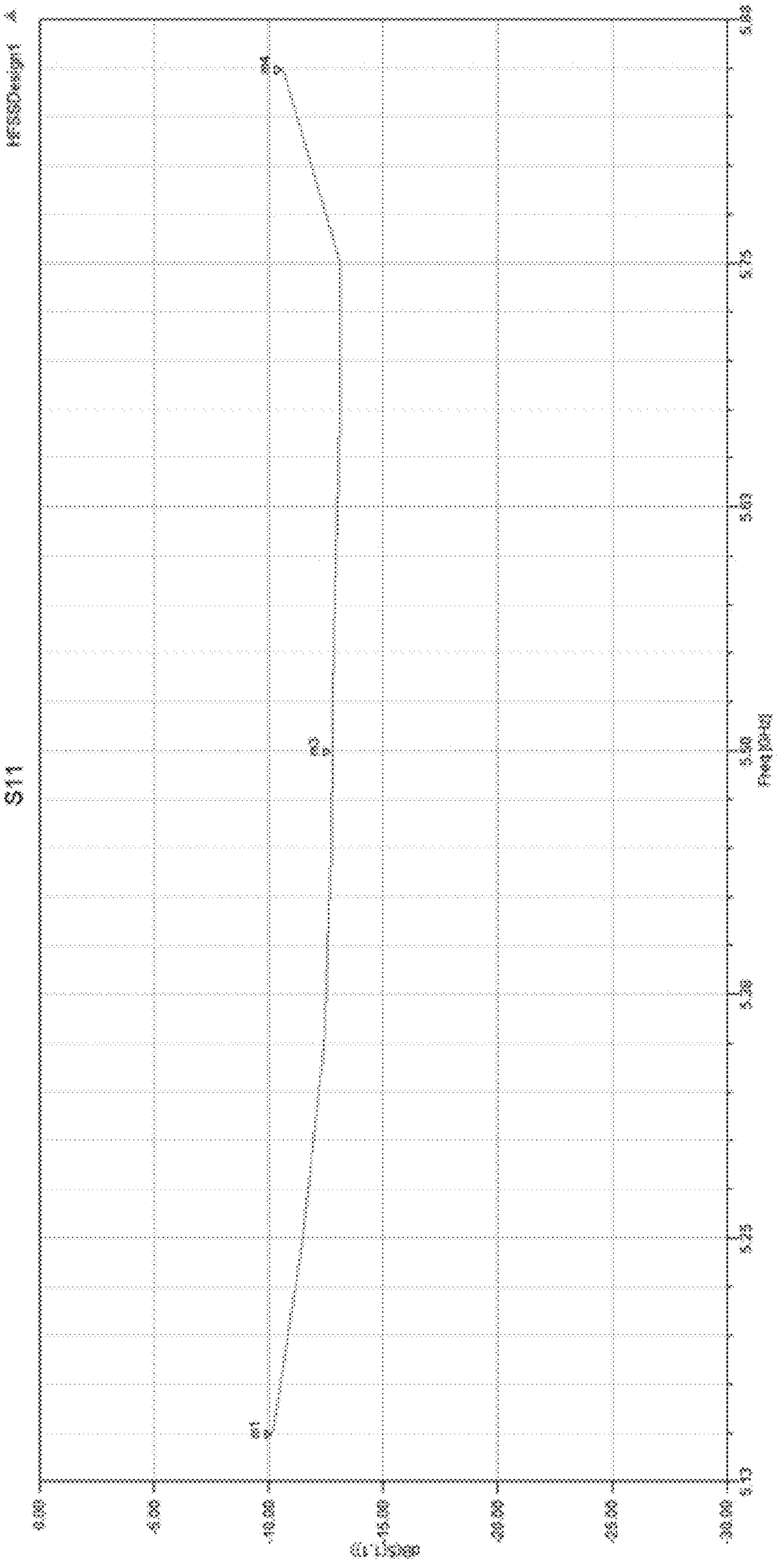

FIG. 16 shows the feeding network 130 of FIG. 12*a* with three switches 139*a-c* closed and the other switches 139*d-f* open. FIGS. 17*a-d* show for the embodiment of the feeding network 130 of FIG. 16 a perspective view of the radiation pattern, a cross-sectional view of the radiation pattern for a constant elevation angle, a cross-sectional view of the radiation pattern for a constant azimuth angle and a graph illustrating the antenna matching as a function of frequency. As will be appreciated, because only half of the switches, namely the switches 139*a-c* are closed, the radiation patterns shown in FIGS. 17*a-c* are more directive than the radiation patterns shown for the "omni-directional" case in FIGS. 13*a-c* and the radiation patterns shown in FIGS. 15*a-c* for the case of four switches 139*a-d* closed.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. An antenna for a wireless device, the antenna comprising:

an electrically conductive radiation structure comprising a plurality of radially extending radiation slots, wherein each of the plurality of radially extending radiating slots has an open outer end at a perimeter of the electrically conductive radiation structure and defines a respective radiation portion of a plurality of radiation portions of the electrically conductive radiation structure;

a feeding network configured to feed a radio frequency (RF) signal to the electrically conductive radiation structure, wherein the feeding network comprises a plurality of feeding arms configured to feed the RF signal into each of the plurality of radiation portions of the electrically conductive radiation structure for exciting each of the plurality of radiation portions to emit electromagnetic waves;

a grounding structure comprising an electrically conductive grounding surface, wherein the electrically conductive grounding surface is spaced from and faces the plurality of radiation portions of the electrically conductive radiation structure for guiding the electromagnetic waves emitted by the plurality of radiation portions; and an electrically non-conductive substrate, wherein the electrically conductive radiation structure is fixed to a first side of the electrically non-conductive substrate, the feeding network is fixed to a second side of the electrically non-conductive substrate which is different from the first side, and wherein electrically non-conductive material of the electrically non-conductive substrate at least partially fills the plurality of radially extending radiation slots.

2. The antenna of claim 1, wherein the plurality of radiation portions of the electrically conductive radiation structure are coplanar.

3. The antenna of claim 2, wherein the electrically conductive grounding surface extends at least partially in parallel to the plurality of radiation portions of the electrically conductive radiation structure.

4. The antenna of claim 1, wherein the electrically conductive radiation structure is radially symmetric.

5. The antenna of claim 1, wherein the electrically conductive radiation structure comprises at least three radially extending radiation slots, wherein the at least three radially extending radiation slots define at least three radiation portions of the electrically conductive radiation structure.

6. The antenna of claim 1, wherein the plurality of radially extending radiation slots are uniformly distributed around a centre of the electrically conductive radiation structure.

7. The antenna of claim 1, wherein each of the plurality of feeding arms is arranged and configured such that at least a feeding arm portion of each feeding arm is inductively or galvanically coupled to a respective radiation portion of the electrically conductive radiation structure for exciting the respective radiation portion to emit electromagnetic waves.

8. The antenna of claim 7, wherein each feeding arm portion extends substantially perpendicular to a respective radially extending radiation slot.

9. The antenna of claim 1, wherein each radially extending radiation slot extends from the open outer end at the perimeter of the electrically conductive radiation structure to an inner end having a finite radius.

10. The antenna of claim 1, wherein the electrically conductive radiation structure further comprises a plurality of radially extending de-coupling slots for de-coupling the plurality of radiation portions of the electrically conductive radiation structure, wherein each of the radially extending de-coupling slots has an open outer end at the perimeter of the electrically conductive radiation structure.

11. The antenna of claim 10, wherein the electrically conductive radiation structure further comprises a recess at an inner radius of a respective radially extending de-coupling slot, wherein each recess has a width larger than a width of the respective radially extending de-coupling slot.

12. The antenna of claim 10, wherein each radially extending de-coupling slot is arranged half-way between two adjacent radially extending radiation slots.

13. The antenna of claim 10, wherein for each radially extending de-coupling slot, the antenna further comprises one or more metal strips arranged on the second side of the electronically non-conductive substrate, wherein the one or more metal strips are arranged to extend radially adjacent to a respective radially extending de-coupling slot.

14. The antenna of claim 1, wherein for each feeding arm, the antenna further comprises a switch of a plurality of switches, wherein all of the plurality of radiation portions of the electrically conductive radiation structure are excited by the RF signal provided by the feeding network, while all of the plurality of switches are closed, and wherein a subset of the plurality of radiation portions of the electrically conductive radiation structure are excited by the RF signal provided by the feeding network, while a subset of the plurality of switches are open.

15. The antenna of claim 1, wherein for each feeding arm, the antenna further comprises a switch of a plurality of switches electrically connected to the electrically conductive grounding surface, wherein all of the plurality of radiation portions of the electrically conductive radiation structure are excited by the RF signal provided by the feeding network, while all of the plurality of switches are open, and wherein a subset of the plurality of radiation portions of the electrically conductive radiation structure are excited by the RF signal provided by the feeding network, while a subset of the plurality of switches are closed.

16. A wireless communication device comprising one or more antennas, wherein each of the one or more antennas comprises:

an electrically conductive radiation structure comprising a plurality of radially extending radiation slots, wherein each of the plurality of radially extending radiating slots has an open outer end at a perimeter of the electrically conductive radiation structure and defines a respective radiation portion of a plurality of radiation portions of the electrically conductive radiation structure;

a feeding network configured to feed a radio frequency (RF) signal to the electrically conductive radiation structure, wherein the feeding network comprises a plurality of feeding arms configured to feed the RF signal into each of the plurality of radiation portions of the electrically conductive radiation structure for exciting each of the plurality of radiation portions to emit electromagnetic waves;

a grounding structure comprising an electrically conductive grounding surface, wherein the electrically conductive grounding surface is spaced from and faces the plurality of radiation portions of the electrically conductive radiation structure for guiding the electromagnetic waves emitted by the plurality of radiation portions; and an electrically non-conductive substrate, wherein the electrically conductive radiation structure is fixed to a first side of the electrically non-conductive substrate, the feeding network is fixed to a second side of the electrically non-conductive substrate which is different from the first side, and wherein electrically non-conductive material of the electrically non-conductive substrate at least partially fills the plurality of radially extending radiation slots.

17. The wireless communication device of claim 16, wherein the plurality of radiation portions of the electrically conductive radiation structure are coplanar.

18. The wireless communication device of claim 17, wherein the electrically conductive grounding surface extends at least partially in parallel to the plurality of radiation portions of the electrically conductive radiation structure.

19. The wireless communication device of claim 16, wherein the electrically conductive radiation structure is radially symmetric.

20. The wireless communication device of claim 16, wherein the electrically conductive radiation structure comprises at least three radially extending radiation slots, wherein the at least three radially extending radiation slots define at least three radiation portions of the electrically conductive radiation structure.

* * * * *